(12) United States Patent
Prince et al.

(10) Patent No.: US 10,826,623 B2
(45) Date of Patent: Nov. 3, 2020

(54) PHASE SHIFT KEYED SIGNALING TONE

(71) Applicant: LISNR, Inc., Cincinnati, OH (US)

(72) Inventors: Daniel Paul Prince, Cincinnati, OH (US); Rebekah L. Farrar, Columbus, OH (US); William Knauer, Erlanger, KY (US)

(73) Assignee: LISNR, Inc., Cincinnati, OH (US)

( * ) Notice: Subject to any disclaimer, the term of this patent is extended or adjusted under 35 U.S.C. 154(b) by 204 days.

(21) Appl. No.: 15/847,205

(22) Filed: Dec. 19, 2017

(65) Prior Publication Data

US 2019/0190621 A1   Jun. 20, 2019

(51) Int. Cl.
*H04B 11/00* (2006.01)
*H04L 27/20* (2006.01)
*H04L 27/22* (2006.01)

(52) U.S. Cl.
CPC .............. *H04B 11/00* (2013.01); *H04L 27/20* (2013.01); *H04L 27/22* (2013.01)

(58) Field of Classification Search
CPC .......... H04B 11/00; H04L 27/20; H04L 27/22
See application file for complete search history.

(56) References Cited

U.S. PATENT DOCUMENTS

| | | | |
|---|---|---|---|
| 5,159,703 A | 10/1992 | Lowery | |
| 5,485,839 A | 1/1996 | Aida et al. | |
| 5,764,763 A | 6/1998 | Jensen et al. | |
| 5,889,870 A | 3/1999 | Norris | |
| 5,923,252 A | 7/1999 | Sizer et al. | |
| 6,570,500 B1 | 5/2003 | Pieper | |
| 6,947,893 B1 | 9/2005 | Iwaki et al. | |
| 8,140,331 B2 | 3/2012 | Lou | |
| 8,401,569 B1 | 3/2013 | Bell et al. | |
| 8,532,644 B2 | 9/2013 | Bell et al. | |
| 8,711,656 B1 | 4/2014 | Paulson | |
| 8,976,959 B2 | 3/2015 | Duplan et al. | |
| 8,983,089 B1 | 3/2015 | Chu et al. | |

(Continued)

FOREIGN PATENT DOCUMENTS

| | | |
|---|---|---|
| CN | 103 023 583 B | 4/2015 |
| EP | 1758308 A1 | 2/2007 |

(Continued)

*Primary Examiner* — Daniel Pihulic

(74) *Attorney, Agent, or Firm* — Wood Herron & Evans LLP

(57) ABSTRACT

A disclosed device is configured to generate and transmit a sonic signal that encodes a symbol sequence, representing a data message, for delivery as audio content. The device includes an audio transmitter and a processor circuit. The processor circuit is configured to encode the data message as a sequence of symbols, with each symbol encoding a data value that is associated with respective phase characteristics of a transmitted audio carrier. The processor is further configured to generate audio samples of a digitized version of the sequence of symbols using the phase characteristics of the audio carrier associated with the symbols, and to control the audio transmitter to generate and transmit the sonic signal, based on the audio samples. A further disclosed device is configured to receive the sonic signal and to decode a symbol sequence by identifying symbols corresponding to determined phases of the sonic signal.

20 Claims, 15 Drawing Sheets

(56) References Cited

U.S. PATENT DOCUMENTS

| | | |
|---|---|---|
| 8,989,779 B1 | 3/2015 | Centore, III |
| 9,024,998 B2 | 5/2015 | Chu et al. |
| 9,111,326 B1 | 8/2015 | Worley, III et al. |
| 9,213,969 B2 | 12/2015 | Arentz |
| 9,513,861 B2 | 12/2016 | Lin et al. |
| 9,912,415 B2 | 3/2018 | Tsfaty et al. |
| 2005/0008325 A1 | 1/2005 | Ollis et al. |
| 2005/0177361 A1 | 8/2005 | Srinivasan |
| 2006/0136544 A1 | 6/2006 | Atsmon et al. |
| 2007/0220544 A1 | 9/2007 | Nash-Putnam |
| 2007/0272750 A1 | 11/2007 | Bjorklund |
| 2008/0134264 A1 | 6/2008 | Narendra et al. |
| 2008/0227436 A1 | 9/2008 | Gantman et al. |
| 2009/0019061 A1 | 1/2009 | Scannell, Jr. |
| 2009/0088133 A1 | 4/2009 | Orlassino |
| 2009/0210789 A1 | 8/2009 | Thakkar et al. |
| 2010/0053169 A1 | 3/2010 | Cook |
| 2010/0165879 A1 | 7/2010 | Gupta et al. |
| 2011/0029359 A1 | 2/2011 | Roeding et al. |
| 2011/0143677 A1 | 6/2011 | Jung et al. |
| 2011/0164595 A1 | 7/2011 | So et al. |
| 2011/0179182 A1 | 7/2011 | Vadla Ravnas |
| 2011/0301439 A1 | 12/2011 | Albert et al. |
| 2012/0051187 A1 | 3/2012 | Paulson |
| 2012/0084131 A1 | 4/2012 | Bergel et al. |
| 2012/0134238 A1 | 5/2012 | Surprenant et al. |
| 2012/0209949 A1 | 8/2012 | Deliyannis et al. |
| 2012/0214416 A1 | 8/2012 | Kent et al. |
| 2012/0232906 A1 | 9/2012 | Lindahl |
| 2012/0295560 A1 | 11/2012 | Mufti |
| 2013/0078988 A1 | 3/2013 | Bell et al. |
| 2013/0106977 A1 | 5/2013 | Chu et al. |
| 2013/0176984 A1 | 7/2013 | Koezuka |
| 2013/0279300 A1 | 10/2013 | Iwase et al. |
| 2014/0039654 A1 | 2/2014 | Akiyama et al. |
| 2014/0050321 A1 | 2/2014 | Albert et al. |
| 2014/0129232 A1 | 5/2014 | Jones et al. |
| 2014/0172141 A1 | 6/2014 | Mangold |
| 2015/0113094 A1 | 4/2015 | Williams et al. |
| 2015/0309151 A1 | 10/2015 | Shibata et al. |
| 2016/0142157 A1 | 5/2016 | Jeong et al. |
| 2017/0279542 A1 | 9/2017 | Knauer et al. |
| 2019/0096412 A1 * | 3/2019 | Knauer .................. G10L 19/02 |
| 2019/0190621 A1 * | 6/2019 | Prince .................... H04B 11/00 |
| 2019/0268078 A1 * | 8/2019 | Okunev ............ H04W 72/0453 |

FOREIGN PATENT DOCUMENTS

| | | |
|---|---|---|
| EP | 2847984 A1 | 3/2015 |
| EP | 3207639 A1 | 8/2017 |
| EP | 3358811 A1 | 8/2018 |
| JP | 06-90296 A | 1/1994 |
| JP | 2001-320337 A | 11/2001 |
| JP | 2003-1744404 A | 6/2003 |
| JP | 2007-164659 A | 6/2007 |
| JP | 2008-293393 A | 12/2008 |
| JP | 2011-141784 A | 7/2011 |
| KR | 10-1136279 B1 | 4/2012 |
| WO | 2002/45273 A2 | 6/2002 |
| WO | 2005/122483 A1 | 12/2005 |
| WO | 2013/129587 A1 | 9/2013 |
| WO | 2013/166158 A1 | 11/2013 |
| WO | 2014/069617 A1 | 5/2014 |
| WO | 2014/104284 A1 | 7/2014 |
| WO | 2016/061353 A1 | 4/2016 |
| WO | 2016123047 A1 | 8/2016 |
| WO | WO-2019067861 A1 * | 4/2019 ........... G01L 19/018 |

* cited by examiner

| Constellation index | Phase offset (rads) | Encoded bits |
|---|---|---|
| 0 | 0 | 000 |
| 1 | π/4 | 001 |
| 2 | π/2 | 011 |
| 3 | 3π/4 | 010 |
| 4 | π | 110 |
| 5 | 5π/4 | 111 |
| 6 | 3π/2 | 101 |
| 7 | 7π/4 | 100 |

PHASE SHIFT KEYED SIGNALING TONE

CROSS REFERENCE TO RELATED APPLICATIONS

This application is related to PCT Application Serial No. US/2013/039079 filed May 1, 2013, which was published in the United States on Apr. 23, 2015 as Publication US2015-0113094, and which claims benefit of U.S. Provisional Patent Application Ser. Nos. 61/781,107 filed Mar. 14, 2013 and 61/640,900 filed May 1, 2012, each of which is incorporated herein by reference in its entirety.

This application is also related to PCT Application Serial No. US/2015/055738 filed Oct. 26, 2015, which claims benefit of U.S. Provisional Patent Application Ser. No. 62/064,468 filed Oct. 15, 2015, which is incorporated herein in its entirety.

This application is also related to PCT Application Serial No. US/2017/024025 filed Mar. 24, 2017, which claims benefit of U.S. patent application Ser. No. 15/081,158 filed Mar. 25, 2016, which is incorporated herein in its entirety.

TECHNICAL FIELD

This application generally relates to systems and methods for delivering information from a sending to a receiving device using one or more sonic signals transmitted by the sending device and received by the receiving device.

BACKGROUND

Various proposals have been made to include sonic signaling tones into audio content that is broadcast or played back audibly in a public or private environment, or delivered electronically. The signaling tones are designed for reception and decoding by a decoding device, such as a portable multifunction device. For example, the sonic signal may be delivered embedded in audio content that is received by a microphone of the decoding device. The source of the signal may be any audio speaker within the proximity of the portable multifunction device, or the audio content may be supplied for decoding by an on-board audio generating application, such as music player module, or an on-board video player application, such as video player module, or provided to a line-out port (such as a headphone jack) of a decoding device, or provided to an external speaker of the decoding device.

Example systems and methods for embedding sonic signals into audio content are provided in the above-referenced patent applications, as well as the following US patent applications, the entirety of which applications is hereby incorporated by reference in their entirety: U.S. patent application Ser. No. 13/286,613 entitled "SYSTEM EFFECTIVE TO MODULATE A CODE AND PROVIDE CONTENT TO A USER" filed Nov. 1, 2011, U.S. patent application Ser. No. 13/286,670 entitled "SYSTEM EFFECTIVE TO DEMODULATE A MODULATED CODE AND PROVIDE CONTENT TO A USER" filed September Nov. 1, 2011, and U.S. patent application Ser. No. 13/286,727 entitled "DEVICE EFFECTIVE TO MODULATE A CODE AND TO PROVIDE CONTENT TO A USER" filed Nov. 1, 2011.

Sonic signals, as described in these filings, are generally outside the range of human hearing or other signals not otherwise decipherable by humans. For example, in some embodiments, the sonic signal may be generated by frequencies above 20,000 Hz or less than 20 Hz, or in a frequency band near to 20,000 Hz or near to 20 Hz which is generally inaudible. The sonic signal may be the form of a modulated code, as described in the above-reference patent applications, which is a series of logic 0s and 1s. The modulated code may be repeatedly and periodically output by the sound source, enabling the decoding device to identify and demodulate the modulated code in the sonic signal to determine the logical series of 0s and 1s associated with the sonic signal. In some embodiments, the logical series of 0s and 1s may be, for example, a coded identifier which can be transmitted to a content management system via various communications protocols.

As used herein, the term sonic signal is used to broadly refer to any type of acoustic signal, code, frequency, waveform, or otherwise that may be transmitted by a source and detected by a decoding device. The sonic signal may be processed by the decoding device by a process or routine passively running on the decoding device.

The previously described systems for producing sonic signals have a number of limitations, specifically in the integrity of data transmission, and in the flexibility of the system to efficiently transmit relatively large amounts of data, and data of different volumes for different applications. Thus, there is a need for an improvement in the methods of formatting and transmitting sonic signals to allow for greater flexibility and functionality than has been previously available.

SUMMARY

A disclosed device is configured to generate and transmit a sonic signal that encodes a symbol sequence, representing a data message, for delivery as audio content. The device includes an audio transmitter and a processor circuit. The processor circuit is configured to encode the data message as a sequence of symbols, with each symbol being associated with transmission of an audio carrier during a time period. Each symbol encodes a data value that is associated with respective phase characteristics of the audio carrier during the time period. The processor circuit is configured to generate audio samples of a digitized version of the sequence of symbols using the phase characteristics of the audio carrier associated with the symbols, and to control the audio transmitter to generate and transmit the sonic signal, based on the audio samples.

A further disclosed device is configured to receive and decode a sonic signal that encodes a symbol sequence, representing a data message, as audio content. The device includes an audio receiver and a processor circuit. The processor circuit is configured to control the audio receiver to receive samples of a digitized version of the sonic signal, into the processor circuit. The processor circuit is further configured to multiply the digitized version of the audio content by a quadrature oscillator, having a selected carrier frequency and sinusoidal real and imaginary parts that are phase offset by $\pi/2$ radians, to generate a complex modulated signal. The processor circuit is further configured to filter the complex modulated signal with a low pass filter to generate a complex baseband signal, and to determine phases of the complex baseband signal. The processor circuit is further configured to decode the symbol sequence by identifying symbols corresponding to determined phases of the complex baseband signal.

A processor implemented method of generating and transmitting a sonic signal that encodes a symbol sequence, representing a data message, for delivery as audio content, is disclosed. The method includes encoding, by a processor circuit, the data message as a sequence of symbols, with each symbol being associated with transmission of an audio carrier during a time period. Each symbol encodes a data value that is associated with respective phase characteristics of the audio carrier during the time period. The method further includes generating, by the processor circuit, audio samples of a digitized version of the sequence of symbols using the phase characteristics of the audio carrier associated with the symbols, and controlling an audio transmitter to generate and transmit the sonic signal, based on the audio samples.

A processor implemented method of receiving and decoding a sonic signal that encodes a symbol sequence, representing a data message, as audio content, is disclosed. The method includes controlling, by the processor circuit, an audio receiver to receive samples of a digitized version of the sonic signal, into the processor circuit. The method further includes multiplying, by the processor circuit, the digitized version of the audio content by a quadrature oscillator, having a selected carrier frequency and sinusoidal real and imaginary parts that are phase offset by $\pi/2$ radians, to generate a complex modulated signal. The method further includes filtering the complex modulated signal with a low pass filter to generate a complex baseband signal. The method further includes determining phases of the complex baseband signal, and decoding the symbol sequence by identifying symbols corresponding to determined phases of the complex baseband signal.

Further embodiments, features, and advantages, as well as the structure and operation of the various embodiments, are described in detail below with reference to the accompanying drawings.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, explain the embodiments of the invention. In the drawings, like reference numbers generally indicate identical, functionally similar, and/or structurally similar elements.

DETAILED DESCRIPTION

The embodiments disclosed herein are generally directed to beacon iteration formats used to transmit data in a sonic signaling tone, and the configuration of decoding devices to detect sonic signal tones that are thus transmitted. The decoding device may be configured to then supply, e.g. wirelessly, an indication of the sonic signal that was received to a content management system. Upon receipt of the indication of the received sonic signal from the decoding device, the content management system may provide particular content to the decoding device based on the particular sonic signal received, as is discussed in detail in the above-referenced prior patent filings.

In further embodiments, a first mobile device may interact directly with a second mobile device to exchange information using sonic signals, as described in further detail below.

Figure 1:
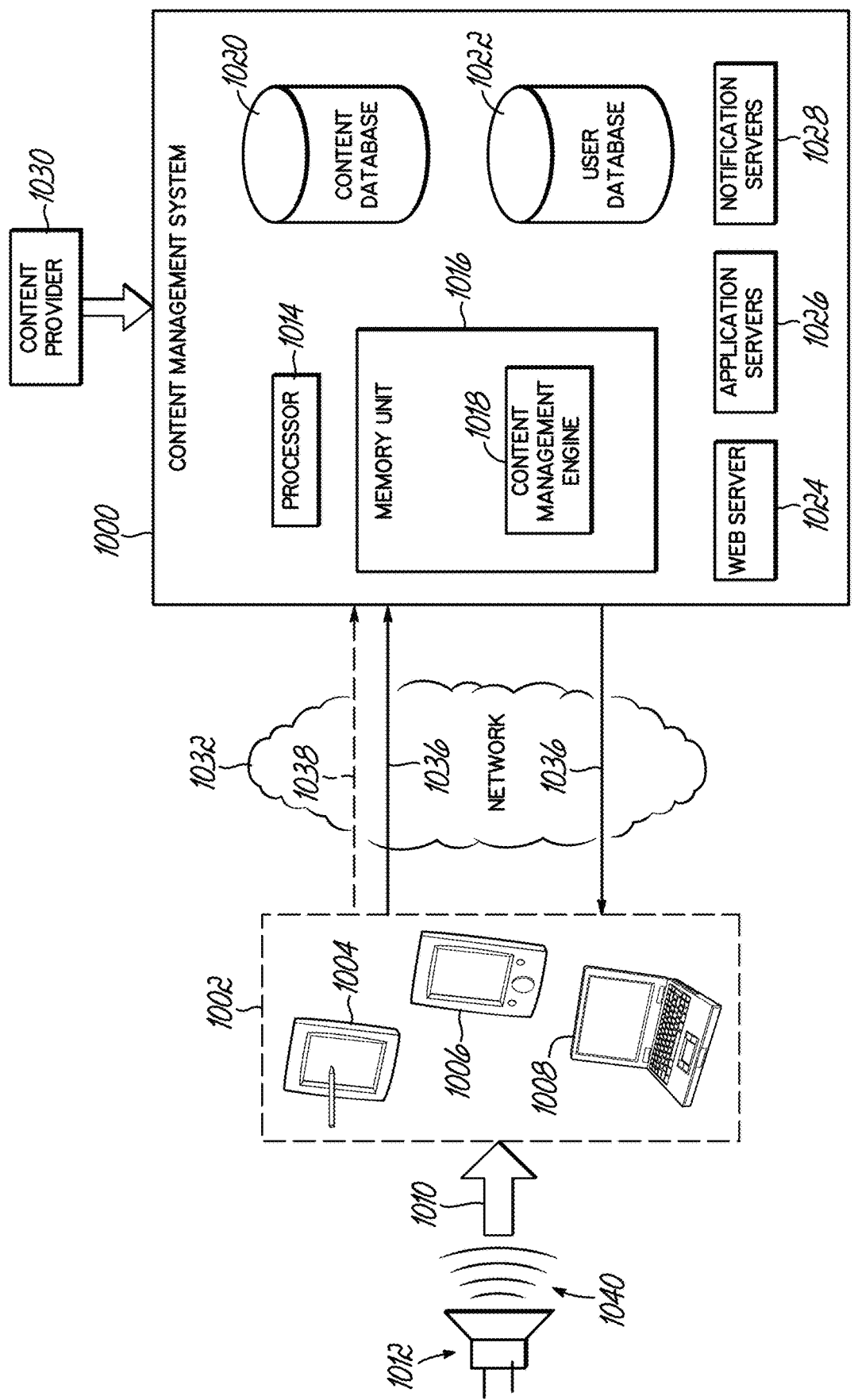
FIG. 1 is a schematic illustration of an example environment in which a mobile device receives content in the form of a sonic signal and further interacts with a content management system, according to an embodiment.

FIG. 1 illustrates one example embodiment of the present disclosure which comprises a content management system 1000 that receives and processes information affiliated with inaudible signals which has been decoded by decoding devices which, in this embodiment, are portable multifunction devices 1002. In this embodiment, the content management system 1000 may then determine which content to provide to users and then wirelessly provide the content to portable multifunction devices 1002 associated with the users. The content management system 1000 may be provided using any suitable processor-based device or system, such as a personal computer, laptop, server, mainframe, or a collection (e.g., network) of multiple computers, for example. The content management system 1000 may include one or more processors 1014 and one or more computer memory units 1016. For convenience, only one processor 1014 and only one memory unit 1016 are shown in FIG. 1. The processor 1014 may execute software instructions stored on the memory unit 1016. The processor 1014 may be implemented as an integrated circuit (IC) having one or multiple cores. The memory unit 1016 may include volatile and/or non-volatile memory units. Volatile memory units may include random access memory (RAM), for example. Non-volatile memory units may include read only memory (ROM), for example, as well as mechanical non-volatile memory systems, such as, for example, a hard disk drive, an optical disk drive, etc. The RAM and/or ROM memory units may be implemented as discrete memory ICs, for example.

The content management system 1000 may be in communication with portable multifunction devices 1002 via an electronic communications network 1032, such as a packet-based communication network in which communication proceeds by the exchange of data packets 1036. The communications network may include a number of computer and/or data networks, including the Internet, LANs, WANs, GPRS networks, etc., and may comprise wired and/or wireless communication links. The portable multifunction devices 1002 that communicate with the content management system 1000 may be any type of client device suitable for communication over the network, such as a palmtop computer, personal computer, a laptop computer, or a netbook computer, for example. In some example embodiments, a user may communicate with the network via a portable multifunction device 1002 that is a combination handheld computer and mobile telephone, sometimes referred to as a smart phone. It can be appreciated that while certain embodiments may be described in connection with user communication via a smart phone or laptop by way of example, the communication may be implemented using other types of user equipment or wireless computing devices such as a mobile telephone, personal digital assistant (PDA), combination mobile telephone/PDA, handheld device, mobile unit, game device, messaging device, media player, or other suitable mobile communications devices.

The memory unit 1016 may store executable software and data for content management engine 1018. When the processor 1014 of the content management system 1000 executes the software of the content management engine 1018, the processor 1014 may be caused to perform the various operations of the content management system 1000. Operations may include, without limitation, receiving an indication of a sonic signal from a portable communication device 1002 (such as in the form of one or more data packets 1036 including a coded identifier 1038 extracted from the sonic signal, for example), identifying content associated with the coded identifier, receiving and analyzing supplemental information received in packet(s) 1036 from the portable communication device 1002, and sending content embedded in one or more packets 1036 to the portable communication device 1002 via the communication network 1032.

Data used by the content management engine 1018 may be from various sources, such as a content database 1020, which may be an electronic computer database, for example. The data stored in the content database 1020 may be stored in a non-volatile computer memory, such as a hard disk drive, a read only memory (e.g., a ROM IC), or other types of non-volatile memory. Also, the data of the content database 1020 may be stored on a remote electronic computer system, for example. The data in the content database 1020 may be, without limitation, video content, audio content, text-based content, and so forth. The items of content in the content database 1020 may be tied to a particular coded identifier, for example. In some embodiments, a content provider 1030 may use a web portal, application program interface (API), or other form of interface to provide and manage content of the content management system 1000. For example, a content provider 1030 may provide instructions to the content management system 1000 to send content "A", "B", and "C" to portable multifunction devices 1002 that supply a coded identifier "X".

User database 1022, which may be an electronic computer database, for example, may also provide content used by the content management engine 1018. The data stored in the user database 1022 may be stored in a non-volatile computer memory, such as a hard disk drive, a read only memory (e.g., a ROM IC), or other types of non-volatile memory. Also, the data of the user database 1022 may be stored on a remote electronic computer system, for example. Data stored in the user database 1022 may related to information regarding particular users of the content management system 1000, user preferences, user requirements to receive content, and so forth.

In various embodiments, a decoding device may detect the sonic signal through a generally passive detection process. In other words, a user of the decoding device does not necessarily have to routinely initiate or activate the detection process. Instead, the detection process may be a background routine that operates in the random access memory (RAM) of a decoding device, for example. The background routine may periodically, or at least routinely, query signals received or generated by various on-board components of the decoding device in order to detect if a sonic signal is present. These queries may be performed without additional input from the user. Components queried by the detection process may include, without limitation, on-board microphones, on-board speakers, and other audio output ports (such as a headphone output or a line level output, for example).

The sonic signal may be received by the decoding device from any suitable source. For example, the sonic signal may be embedded in audio content that is received by a microphone of the decoding device. In this regard, the source may be any audio speaker within the proximity of the decoding device. The audio content may also be supplied by an on-board audio generating application, such as music player module, or an on-board video player application, such as video player module, or provided to a line-out port (such as a headphone jack) or an external speaker of the decoding device.

Upon detecting a sonic signal, the decoding device may process the sonic signal to extract a coded identifier. The extraction process may be performed by the processor of the decoding device 1002 or may be performed by a remote server which is provided with the sonic signal in a sampled form. In some embodiments, a coded identifier is extracted from the sonic signal and the coded identifier 1038 may then be provided to content management system 1000 via communication network 1032. Supplemental information may also be provided to the content management system 1000 along with the coded identifier, such as a time/date data, accelerometer data, geographic data, demographic data, device data, owner data, and so forth. The format of the content may be binary, text, numeric, or any combination of these.

The content management system 1000 may process the received information to identify content to transmit to the decoding device. The content may be stored locally to the content management system or may be stored in data stores remote from the content management system. The content may be in any suitable file format or file type. A non-limiting and non-exhaustive list of example content that may be provided to a decoding device includes video-based content, audio-based content, image-based content, and text-based content.

Video-based content may include, without limitation, concert footage, music videos, artist interviews, movies, commercials and so forth. Audio-based content may include, without limitation, songs, ringtones, and so forth. Image-based content may include, without limitation, pictures, logos, wallpapers, and so forth. Text-based content may include, without limitation, lyrics, quotes, coupons, passwords, passcodes, email messages, text messages, instant messages, and so forth. In some embodiments, the content may be advertisements or educational in nature. This disclosure is not limited to any particular content which may be delivered to decoding devices associated with the content management system.

In various embodiments, the particular content delivered to a decoding device may be based on the coded identifier and one or more triggers. Over time additional content may be accessible (unlocked) as the decoding device, or user of the device, satisfies various thresholds. For example, the number of times a particular sonic signal has been received by the device may determine which content is sent to the device. If the sonic signal is embedded in a song, the number of times the sonic signal is received may indicate the number of times the song has been listened to by a user associated with the device. As the user listens to the song more and more, additional content ("unlocked content") may be delivered to that user's device.

Additional content may be labeled or otherwise considered as "exclusive" content that is only available to certain types or groups of listeners. For example, a sonic signal may be broadcast at a music venue while an artist is performing a concert. Audience members having devices passively detecting for sonic signals will receive and process the sonic signal. The device may then extract the coded identifier and provide the information to a content management system 1000 via a wireless communications network 1032. The content management system 1000 may match the coded identifier to stored content associated with the performing artist. The content may then be pushed to the decoding device 1002 that originally sent the coded identifier. The user will then be able to access the content via their decoding device. Thus, in the illustrated embodiment, the decoding device passively detected the sonic signal, extracted the coded identifier, transmitted the coded identifier and received affiliated content without any input or interaction from a user.

In some embodiments, the particular content delivered to a decoding device may be function of where the device is geographically located. In other words, decoding devices in a first city that passively detect a certain sonic signal may receive a first piece of content while decoding devices in a second city that detect the same sonic signal may receive a second piece of content. Additionally, the content delivered to the decoding device may depend on other triggers, such as whether the decoding device is moving (in a car), the time of day, user preferences, and so forth.

The content received by the decoding device may be stored, arranged, and viewed in any suitable configuration. The content may be viewed at the time of receipt or at a later point in time. In one embodiment, content is delivered to an electronic mailbox associated with the user. In one embodiment, content is delivered to an application or module that is executable by the decoding device. A user can execute the application and access the content. Content can be sorted in any suitable hierarchy or schema.

In some embodiments, "locked" content may be displayed to the user through the application. In order to unlock the content, the user must, for example, satisfy certain parameters or thresholds. The thresholds may relate to a total number of listens, a geographic location, and so forth. In any event, when content is received by the decoding device, a notification may be provided to the user by the decoding device. In one embodiment, upon receiving the notification, the user can then navigate the associated application to view the content received.

Sonic signals 1040 may, in one embodiment, be embedded in audio songs. The disclosure herein, however, is not so limited. In fact, the systems and methods described herein may be used across a wide variety of platforms and implementations. For example, the passive detection routines described herein can be used to detect sonic signals 1040 associated with television shows, commercials, movies, and the like. In some embodiments, the detection routines described herein can be used to detect stand-alone sonic signals 1040 that are not embedded in audio signals. Such stand-alone sonic signals may be transmitted in, for example, commerce/shopping environments, business environments, music venues, entertainment venues, or any other suitable environments or venues.

A decoding device may also be configured to transmit 1010 sonic signals 1040 using its on-board speaker 1012, for example. The sonic signal 1040 may be received and processed by other decoding devices 1002 positioned proximate the transmitting decoding device. Upon passively detecting the sonic signal and providing an indication of the sonic signal to a content management system, particular content can be delivered to the decoding device in accordance with the systems and methods described herein.

Figure 2:
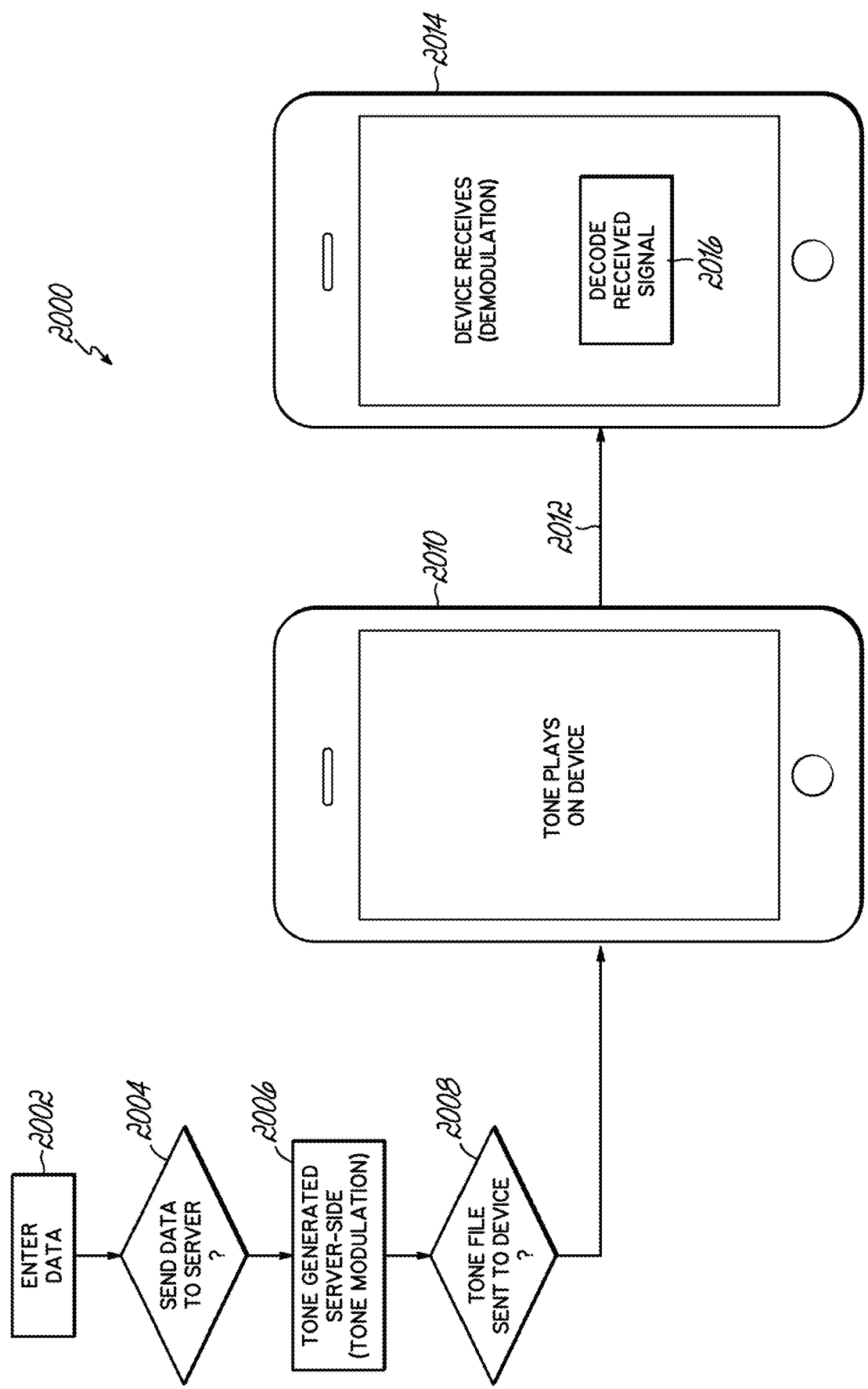
FIG. 2 is a schematic illustration of an example environment in which a sonic tone may be generated and passed to a mobile device using a server and a data connection, according to an embodiment.

It will be appreciated that the use of sonic tones need not involve the operation of a content management system. FIG. 2 illustrates a process by which a message or data may be delivered from one mobile device to another, encoded as a sonic tone or sequence of sonic tones. In the embodiment of FIG. 2 the sonic tones are generated by a server performing the appropriate modulation technique, and then the modulated sonic tone, described as a sequence of audio samples, is passed to a mobile device using a server and a data connection, according to an embodiment. In this example, in stage 2002, a user may enter data using a mobile or standalone device. In other embodiments, data to be modulated may be obtained from a server or storage device, either in real time or prior to the interaction. In stage 2004, the data may be sent to a modulating server. In stage 2006, the server may receive the data and use it to encode the message as a symbol sequence representing a binary message for delivery as audio content.

In this example, the binary message is encoded into a sequence of symbols wherein each symbol is associated with phase characteristics. The server may then generate audio samples of a digitized version of the sequence of symbols using the phase characteristics associated with the symbols. The audio samples may then be stored in memory for retrieval by the mobile device 2010 and/or transmitted to mobile device 2010. In some embodiments, the audio samples may be stored in a tone file.

In stage 2008 a tone file generated by the server is sent to device 2010. The tone file may be sent by a wired or wireless connection to device 2010. The first mobile device 2010 may then generate a sonic signal, based on the audio samples, and transmit 2012 the sonic signal, using an audio device associated with the first mobile device 2010.

According to an embodiment, the sonic signal that is generated and transmitted 2012 by the first mobile device 2010 may then be received by a second mobile device 2014. The second mobile device 2014 may receive the sonic signal using a microphone or other sonic signal detection device associated with the second mobile device 2014. The second mobile device 2014 may then decode 2016 the sonic signal that is received from the first device 2010, as described in further detail below.

In the above-described embodiment, the audio samples are generated by the server and may be stored as a tone file. The tone file may then be sent to the first mobile device. In practice, however, the tone file may be so large that sending it to the first mobile device may not be practical. Therefore, it may be more efficient for the first mobile device 2010 to directly generate the audio samples rather than receiving them from the server. Accordingly, in a further embodiment, the first mobile device 2010 may generate the audio samples of the digitized version of the sequence of symbols representing the binary message based on information received by the first mobile device 2010 from the server. In this embodiment, the server may determine what information is to be used to generate the audio samples and may communicate this information to the first mobile device 2010. However, in this embodiment, the server does not generate the audio samples but these are generated in the first mobile device.

Figure 3:
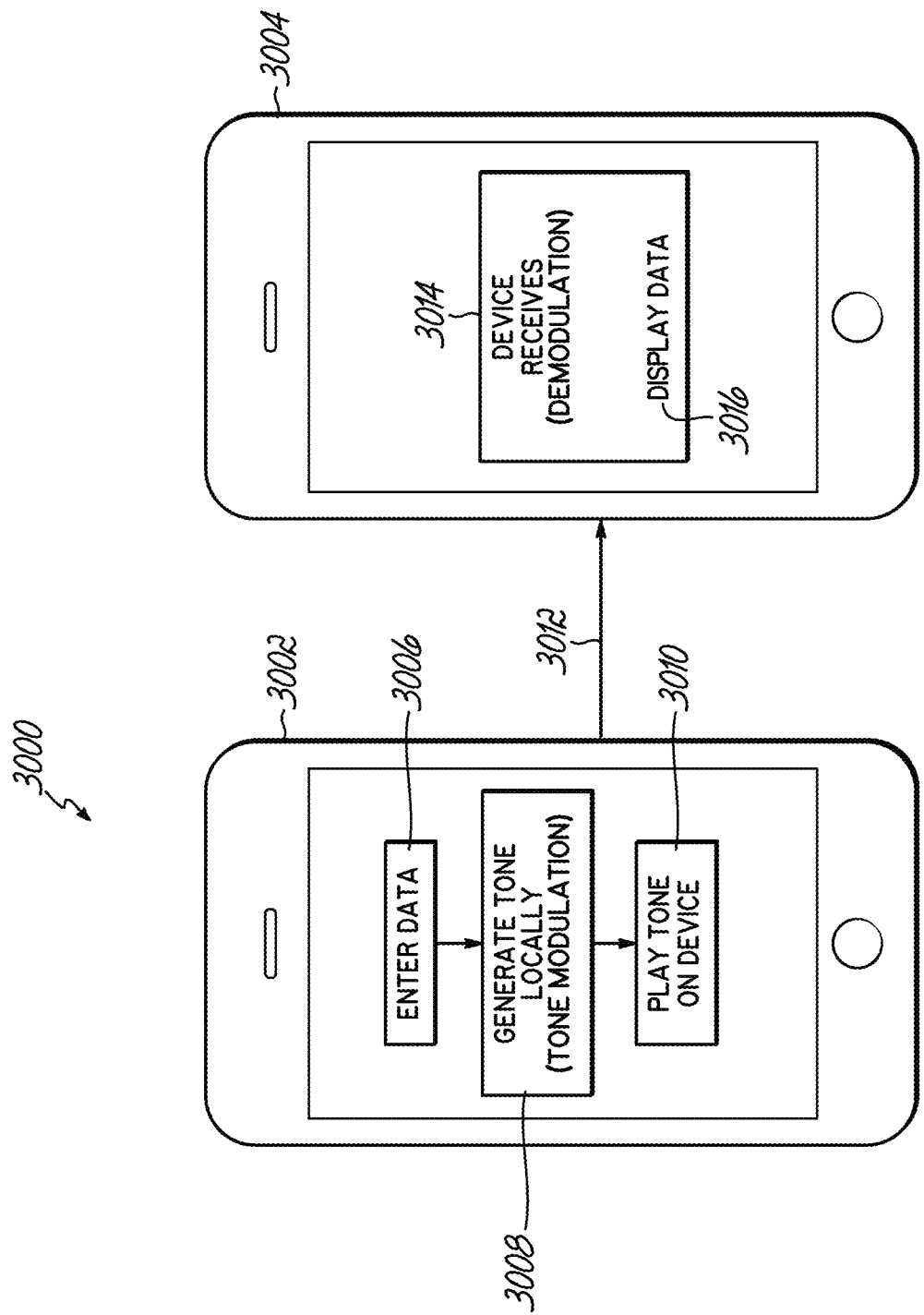
FIG. 3 is a schematic illustration of an example environment in which a sonic tone may be generated by a first mobile device and passed to a second mobile device, according to an embodiment.

FIG. 3 illustrates an embodiment 3000 in which a sonic tone may be generated by a first mobile device 3002 and passed to a second mobile device 3004, according to an embodiment. In this example, a first device 3002 may interact with a second device 3004 by sending and receiving messages encoded as sonic signals. In this example, in stage 3006, a user may enter data using a user interface that is provided by the first mobile device 3002, or obtain that data from a remote server or storage device.

According to the illustrated embodiment, the first device 3002 may use the data to encode a binary message into a sequence of symbols selected from a group consisting of two or more symbols, wherein each symbol is associated with phase characteristics. In stage 3008, the first mobile device 3002 may then generate audio samples of a digitized version of the sequence of symbols using the phase characteristics associated with the symbols. The audio samples may then be stored in memory and/or transmitted to the second mobile device 3004. In some embodiments, the audio samples may be stored in a tone file.

According to an embodiment, in stage 3010, the first mobile device 3002 plays back the generated audio samples, so that the sonic signal is broadcast 3012 for receipt by the second mobile device 3004, using an audio device associated with the first mobile device 3002.

According to an embodiment, the sonic signal that is generated 3008 and transmitted 3012 by the first mobile device 3002 may then be received by a second mobile device 3004. In stage 3014, the second mobile device 3004 may receive the sonic signal using a microphone or other sonic signal detection device associated with the second mobile device 3004. The second mobile device 3004 may then decode the sonic signal that is received from the first device 3002, as described in further detail below. According to an embodiment, in stage 3016, the second device 3004 may display data associated with the received message. In further embodiments, the second mobile device 3004 may perform other operations based on the received message, as would be readily-apparent to persons of ordinary skill in the art.

According to disclosed embodiments, a sonic signal may be generated using phase-shift keying (PSK). PSK modulation begins by specifying a constellation of points in the complex plane, as described in greater detail below and illustrated in FIG. 4.

Figures 4, 5:
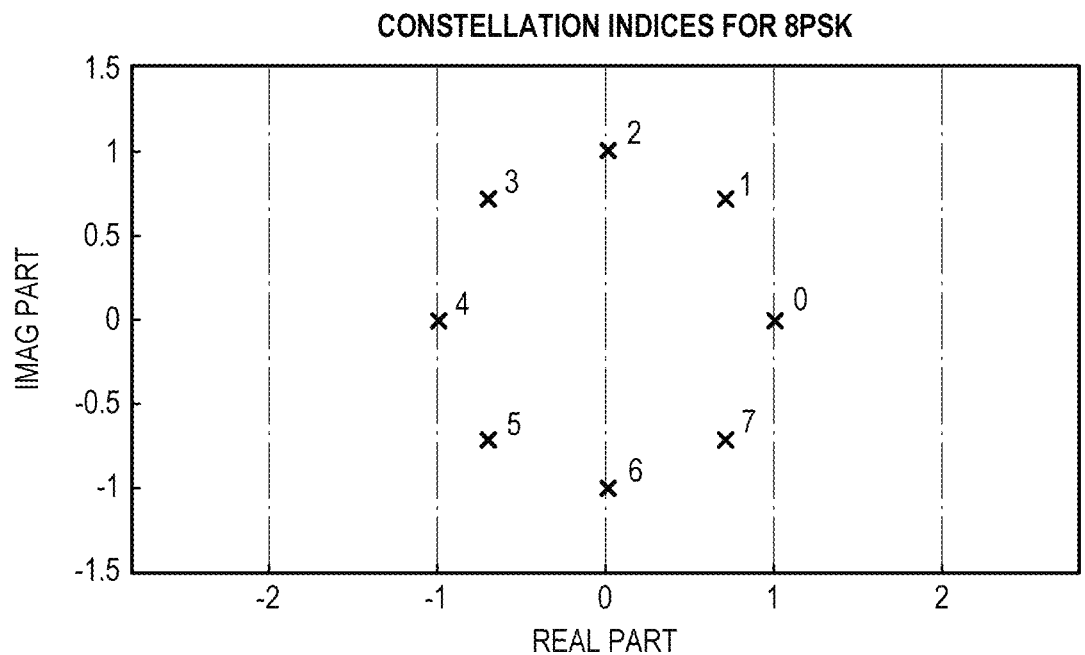
FIG. 4 illustrates an example constellation of points in the complex plane used to define phases associated with symbols in a sonic signal, according to an embodiment.
FIG. 5 provides details of the constellation points of FIG. 4 along with corresponding encoded bits, according to an embodiment.

FIG. 4 illustrates an example constellation of points in the complex plane used to define phases associated with symbols in a sonic signal, according to an embodiment. Typically, the number of selected points are chosen to be a power of two, so that an integer number of bits can be encoded by each point. In this example, the constellation illustrated in FIG. 4 includes eight points described by complex numbers $z=e^{i\varphi}=\cos(\varphi)+i\sin(\varphi)$, where $\varphi$ is the phase. Further details of the constellation points and corresponding encoded bits are described below with reference to FIG. 5.

FIG. 5 provides details of the constellation points of FIG. 4 along with corresponding encoded bits, according to an embodiment. The phases are chosen to be equally spaced in units of $\pi/4$ radians. This encoding scheme is referred to as 8PSK in the following description. Each symbol in the constellation is defined by its phase offset from symbol 0. FIG. 5 shows the mapping between each constellation index, the phase offset $\varphi$ required to generate each constellation index, and the corresponding encoded bits for each symbol. The ordering of encoded bits follows a Gray coding scheme. In this example, phase points are associated with sets of binary bits. In other embodiments, phase points may be associated with other symbols that represent data, as would be readily appreciated by persons of ordinary skill in the art.

According to an embodiment, a process of generating a PSK sonic signal using the constellation points of FIGS. 4 and 5 is illustrated in the following example. A data message may be defined by a sequence of bits. The sequence of bits may then be broken up into sets of bits, each set being associated with a constellation point. The message may then be thought of as a mapping between constellation symbol index and constellation index.

Figure 6:
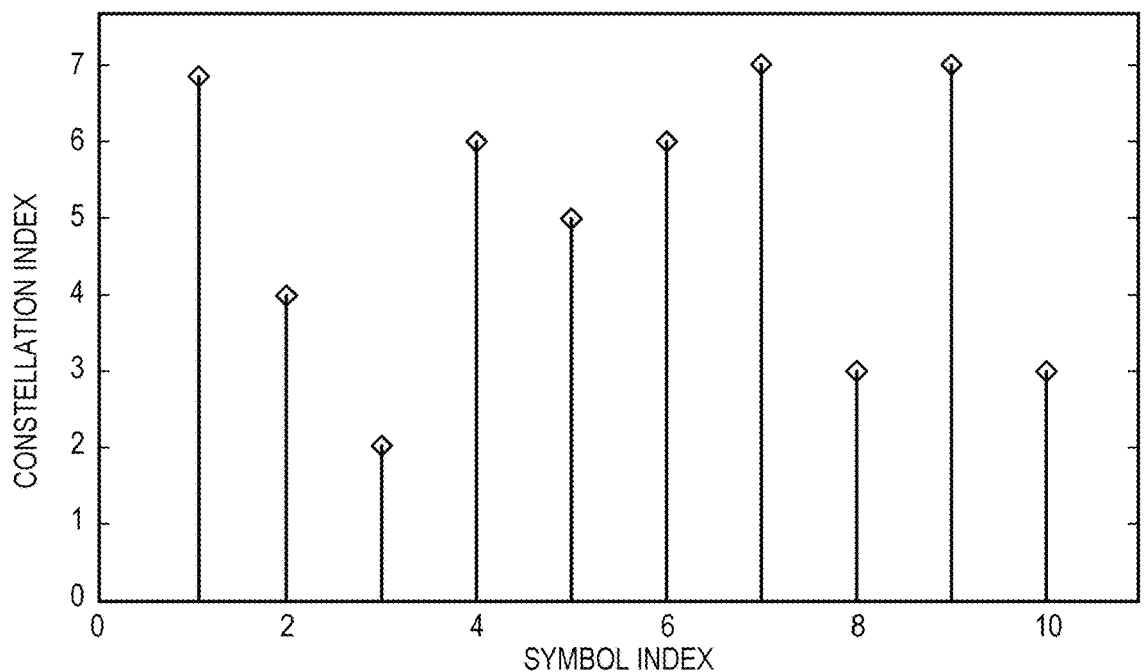
FIG. 6 shows a mapping between symbol index and constellation index representing a binary message, according to an embodiment.

FIG. 6 shows a mapping between symbol index and constellation index representing a binary message, according to an embodiment. The set of constellation indices 7426567373, shown in FIG. 6, thus encodes the sequence of bits 100110011101111101100010100010. A first step in generating an 8PSK modulated signal is to generate a complex baseband signal as described below and illustrated in FIG. 7.

Figure 7:
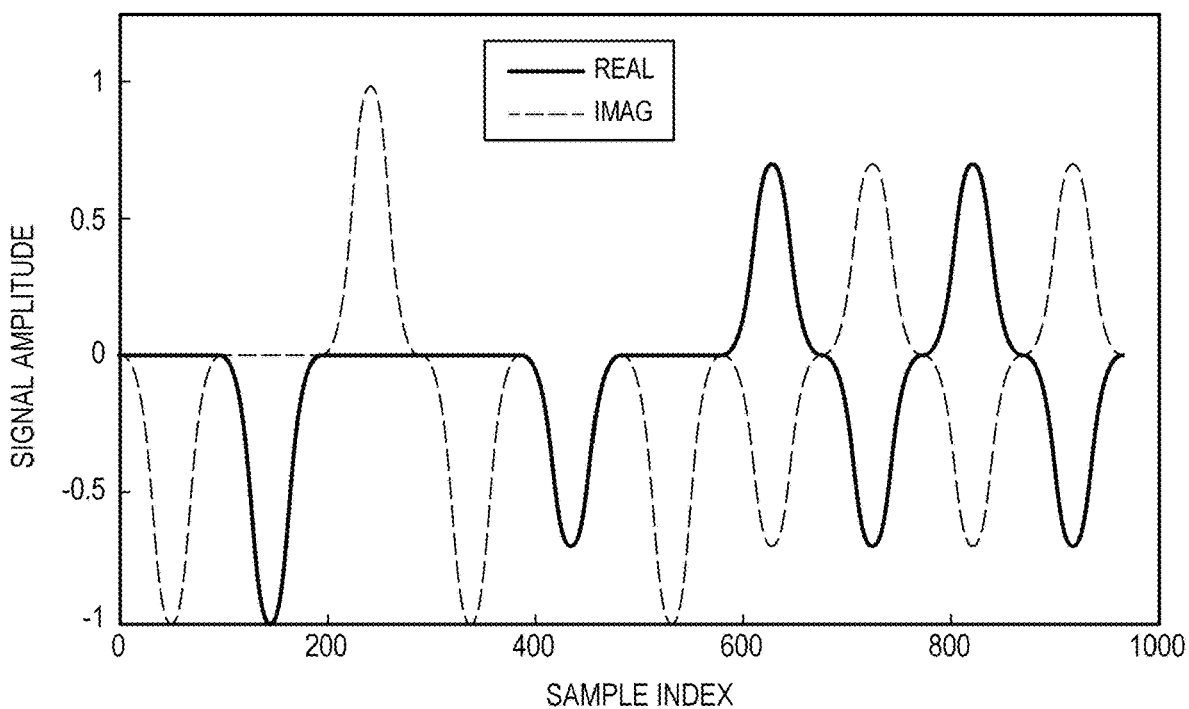
FIG. 7 illustrates a complex baseband signal generated from the set of constellation indices shown in FIG. 6, according to an embodiment.

FIG. 7 illustrates a complex baseband signal generated from the set of constellation indices shown in FIG. 6, according to an embodiment. In this example, a time domain signal is generated according to the following equation:

$$a(t)=f(t)e^{i\varphi(t)},\qquad \text{Eq. (1)}$$

where $f(t)$ is a smooth function that increases from zero amplitude to a maximum amplitude and then decreases to zero amplitude during a time period of a symbol. During the time period of a symbol, the phase (t) takes a constant value given by the phase associated with the given symbol. The real and imaginary parts of Eq. (1) are plotted in FIG. 7. In this way, the complex signal of Eq. (1) encodes the sequence of constellation indices (7426567373) shown in FIG. 6, and thereby encodes the corresponding binary sequence (100110011101111101100010100010).

In the above example, the symbols of FIG. 7 are implemented as 2 ms pulses. The function $f(t)$ is represented as a 96 sample (assuming 48 kHz sampling rate) pulse shape that is used to gradually fade to the intended complex constellation coordinate with unit magnitude, and then to gradually fade the signal back to zero magnitude. In other embodiments, different sampling rates and different functional forms for $f(t)$ may be used, as would be readily appreciated by persons of ordinary skill in the art.

The baseband signal of FIG. 7 is characterized by a spectrum that is near 0 Hz. To transmit this signal as a sonic signal (e.g., at inaudible frequencies), the baseband signal of FIG. 7 is modulated to a passband frequency. According to an embodiment a passband frequency is selected to be centered on 18.6 kHz. This is accomplished by multiplying the baseband signal by a quadrature oscillator with a frequency of 18.6 kHz, whose real part and imaginary parts are sinusoidal but are offset by a phase of π/2 radians. In further embodiments, other frequencies may be used for the quadrature oscillator as dictated by particular use cases. The result of multiplying the baseband signal by the quadrature oscillator is shown in FIG. 8.

Figure 8:
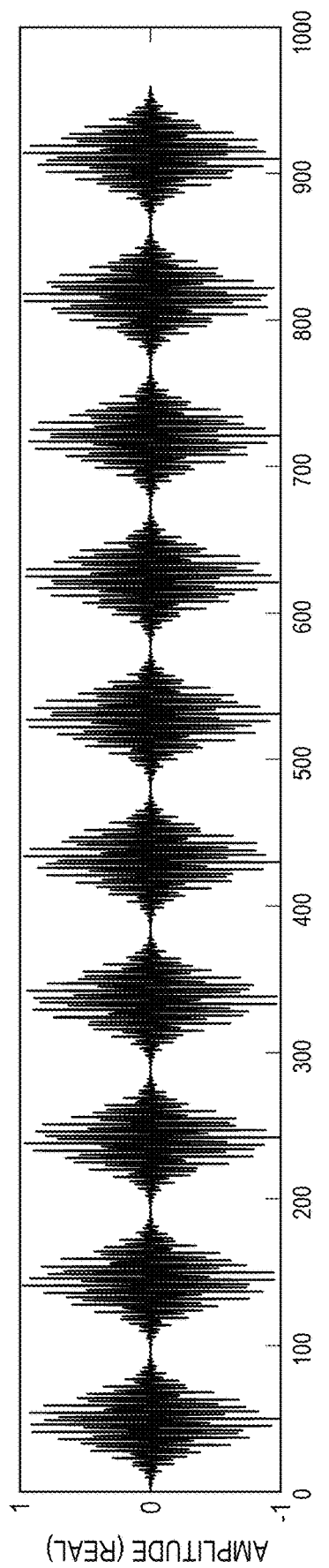
FIG. 8 shows a real passband signal which is the real part of a complex bandpass signal generated from the complex baseband signal of FIG. 7, according to an embodiment.
Figure 9:
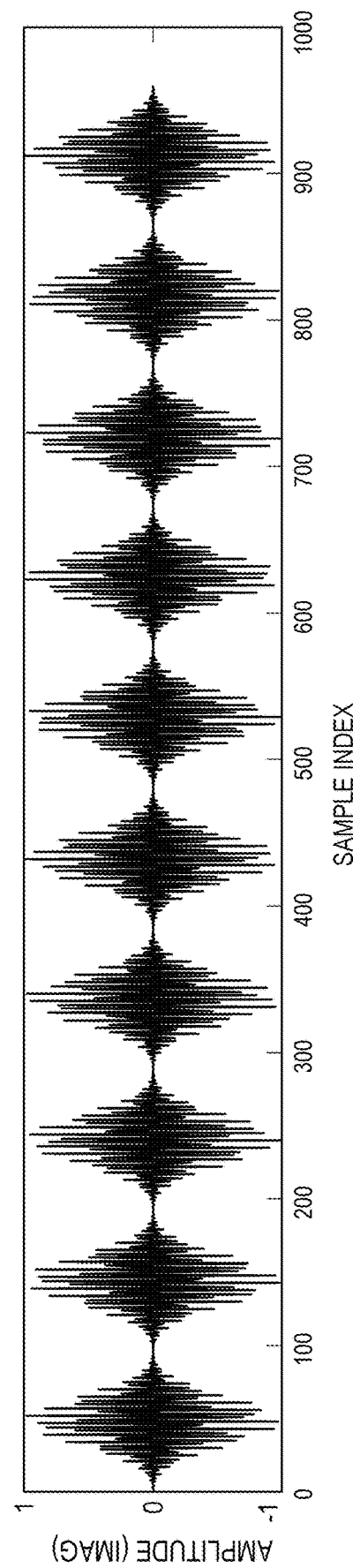
FIG. 9 shows a real passband signal which is the imaginary part of a complex bandpass signal generated from the complex baseband signal of FIG. 7, according to an embodiment.

FIGS. 8 and 9 illustrate real and imaginary components of a complex passband signal generated from the complex baseband signal of FIG. 7, according to an embodiment. Mathematically, the complex baseband signal of Eq. (1) is multiplied by the quadrature oscillator that may be represented as:

$$b(t)=e^{i2\pi ft},\qquad \text{Eq. (2)}$$

to give the complex passband signal:

$$g(t)=a(t)*b(t)=f(t)(\cos(2\pi ft+\varphi(t))+i\,\sin(2\pi ft+\varphi(t))),\qquad \text{Eq. (3)}$$

the real and imaginary parts of which are plotted in FIGS. 8 and 9, respectively.

The modulated signal (e.g., Eq. (2) shown in FIGS. 8 and 9) is represented in software as a complex signal, but only real signals can be played through a speaker as audio. Taking the real part of the complex passband signal results in a signal that is capable of being played back through a speaker, but retains the encoded phase shifts, as shown in FIGS. 9 and 10.

FIG. 8 shows a real passband signal as described above. This signal shows ten real passband 8PSK symbols that encode the constellation points (7426567373) shown in FIG. 6. As discussed above, the real passband signal of FIG. 8 thereby encodes the corresponding binary sequence (100110011101111101100010100010).

Figure 10:
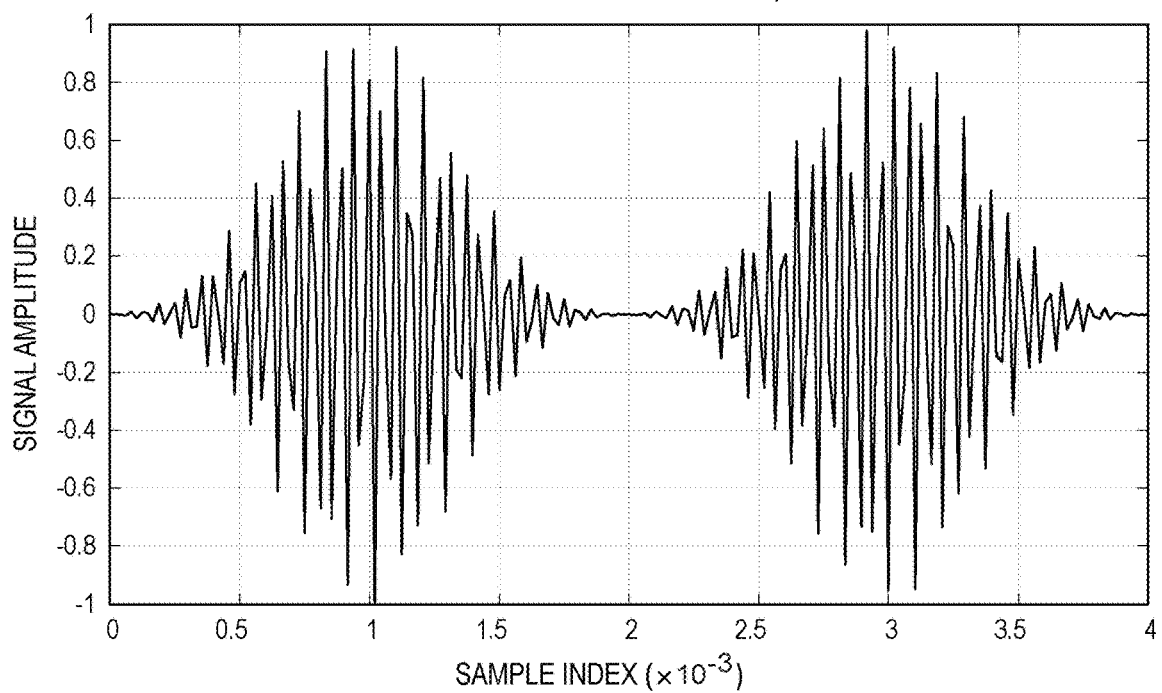
FIG. 10 illustrates a zoomed-in view of two real passband 8PSK symbols taken from the real passband signal of FIG. 9, according to an embodiment.

FIG. 10 illustrates a zoomed-in view of two real passband 8PSK symbols taken from the real passband signal of FIG. 8, according to an embodiment. Each of the symbols of FIGS. 8 and 10 encode phase information that may be played as a sonic signal by an audio transmitter and received by an audio receiver. After playing the modulated real passband signal (of FIGS. 8 and 10), described above, through a speaker for transmission, a receiving device may record the audio. The frequency characteristics of a transmitted signal based on the real passband signals of FIGS. 8 and 10 are described below.

Figure 11:
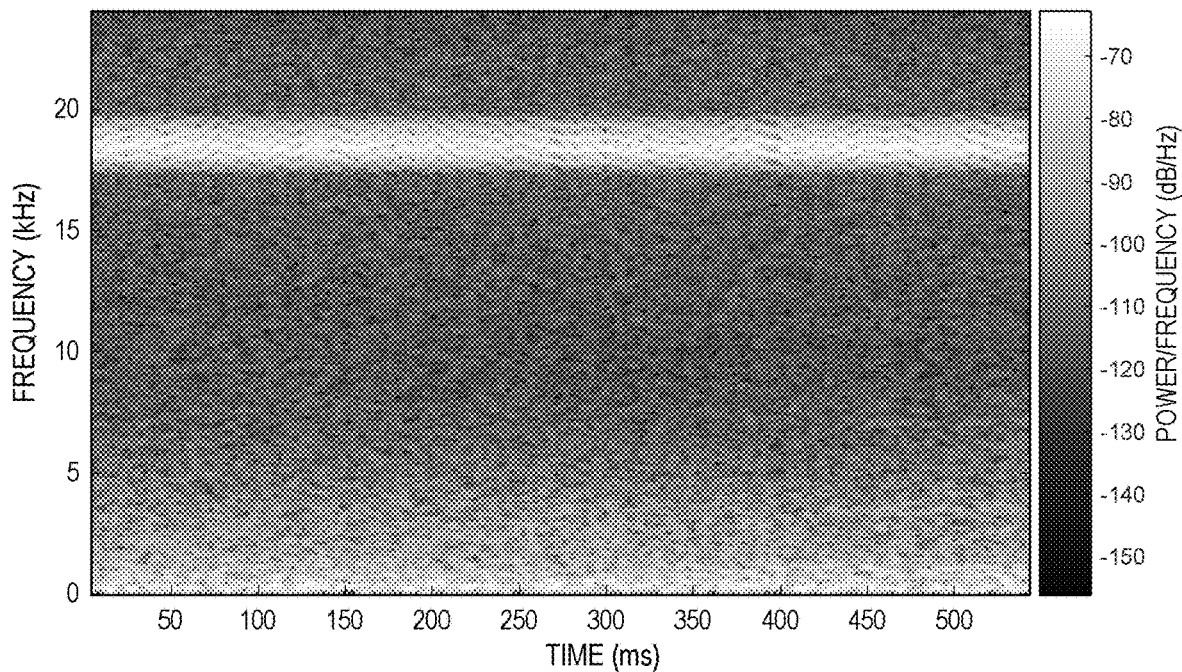
FIG. 11 illustrates a spectrogram shows the sonic 8PSK signal centered around 18.6 kHz as recorded by a receiving device's microphone, as well as the background noise from the environment, according to an embodiment.

FIG. 11 illustrates a spectrogram showing frequency characteristics of the sonic 8PSK signal (of FIGS. 9 and 10) centered around 18.6 kHz as recorded by a receiving device's microphone, including background noise from the environment, according to an embodiment. In this example, the signal frequency (centered around 18.6 kHz) corresponds to human inaudible frequencies.

To return the real passband carrier to baseband, the receiver must first multiply the recorded signal by a quadrature oscillator at 18.6 kHz, which is a complex time dependent signal similar in form to that of Eq. (2), above. Multiplication of sinusoids results in two sinusoidal components at the sum and difference of their frequencies. The recorded carrier and the quadrature oscillator in the receiver both have a frequency of 18.6 kHz, so the sum of their frequencies is 37.2 kHz, and the difference of their frequencies is 0 Hz. However, the summed frequency component of this operation exceeds the 24 kHz Nyquist rate (the highest frequency that can be represented at a 48 kHz sampling rate), resulting in an aliased frequency component of 10.8 kHz (48e3−37.2 kHz).

Figure 12:
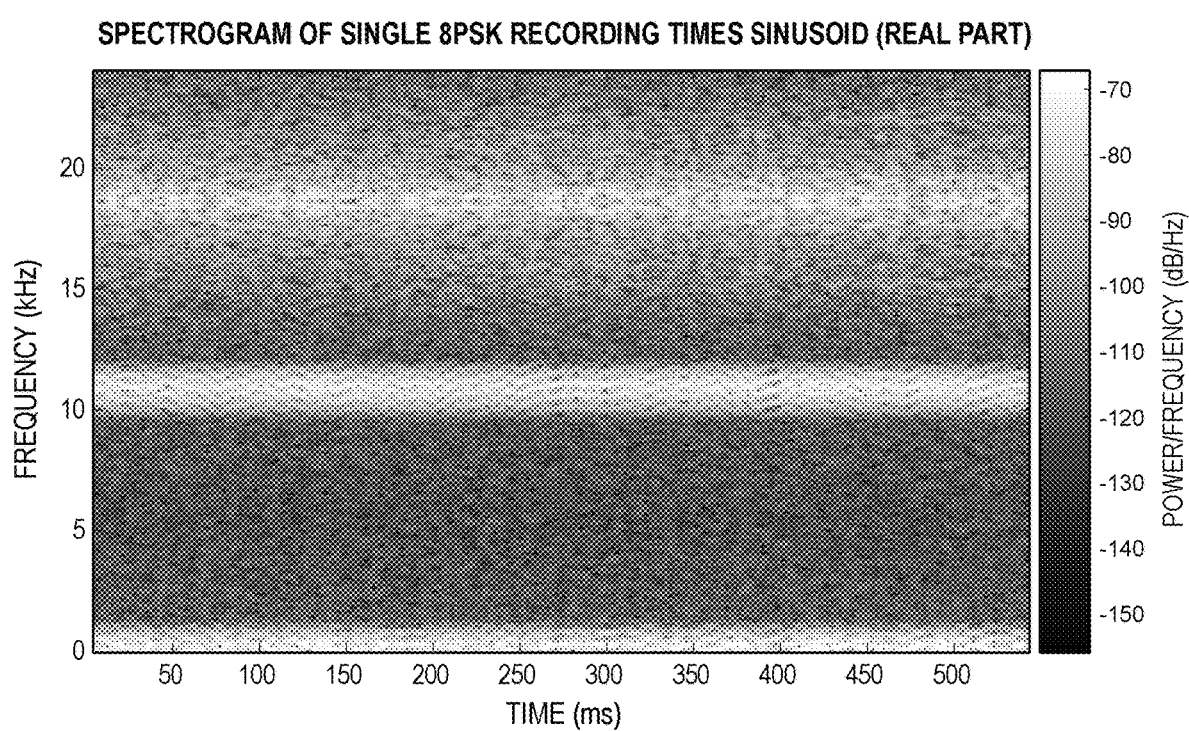
FIG. 12 illustrates a spectrogram showing frequency characteristics of the result of multiplying the recorded signal by the 18.6 kHz quadrature oscillator, according to an embodiment.
Figure 13A:
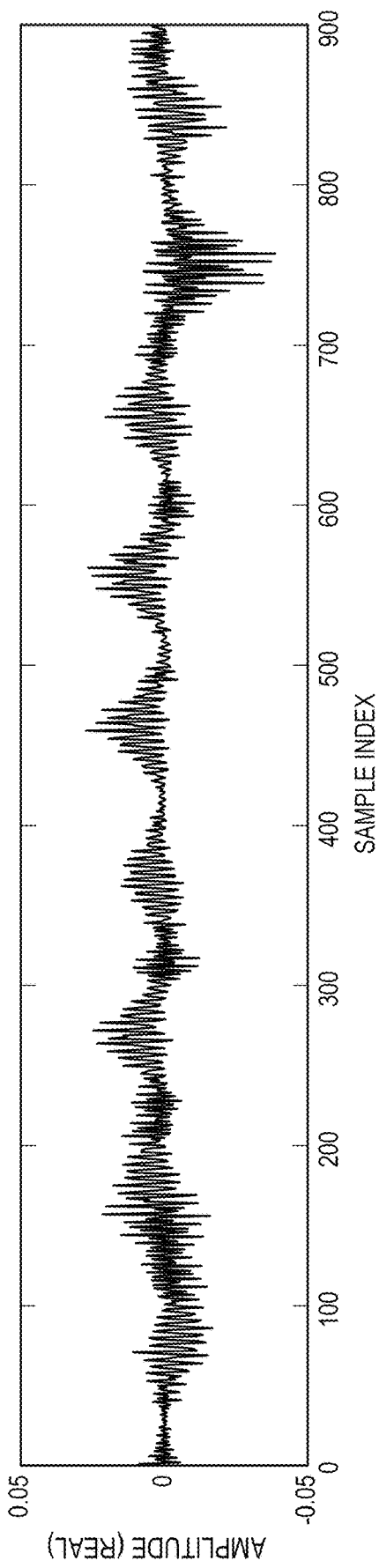
FIG. 13A shows the real component of a signal resulting from multiplying the recorded signal by the 18.6 kHz quadrature oscillator, according to an embodiment.
Figure 13B:
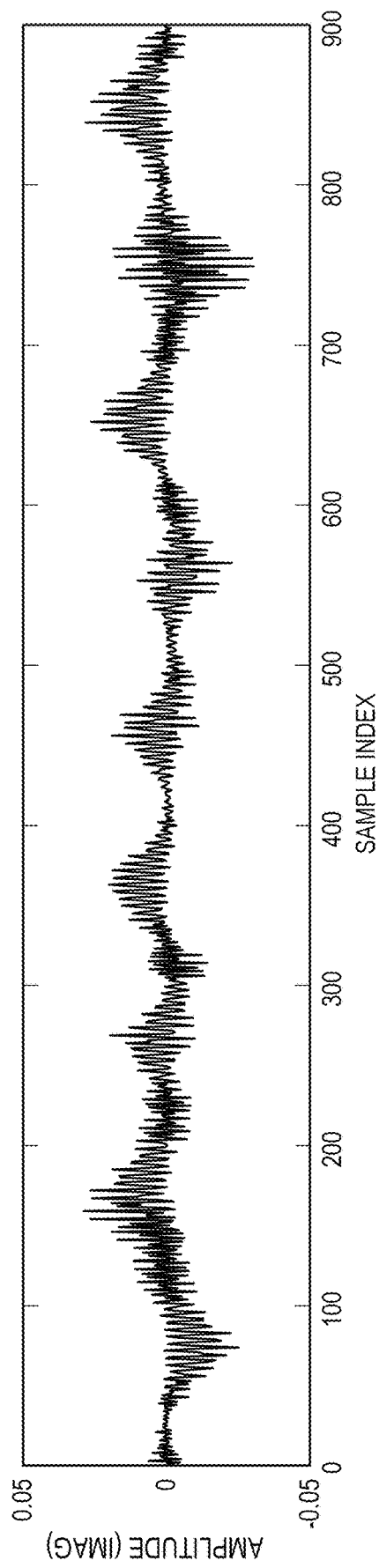
FIG. 13B shows the imaginary component of the signal resulting from multiplying the recorded signal by the 18.6 kHz quadrature oscillator, according to an embodiment.

FIG. 12 illustrates a spectrogram showing frequency characteristics of the result of multiplying the recorded signal by the 18.6 kHz quadrature oscillator, and FIGS. 13A and 13B show the real and imaginary components, respectively, of the resulting signal. The out of band noise (mostly centered at 18.6 kHz) and the copy of the carrier around 10.8 kHz can be clearly seen in FIG. 12. The out of band noise and the copy of the carrier around 10.8 kHz can be removed using convolution with a low pass filter. The result of this filtering operation is shown in FIG. 14, which closely resembles the complex baseband signal generated during modulation.

Figure 14:
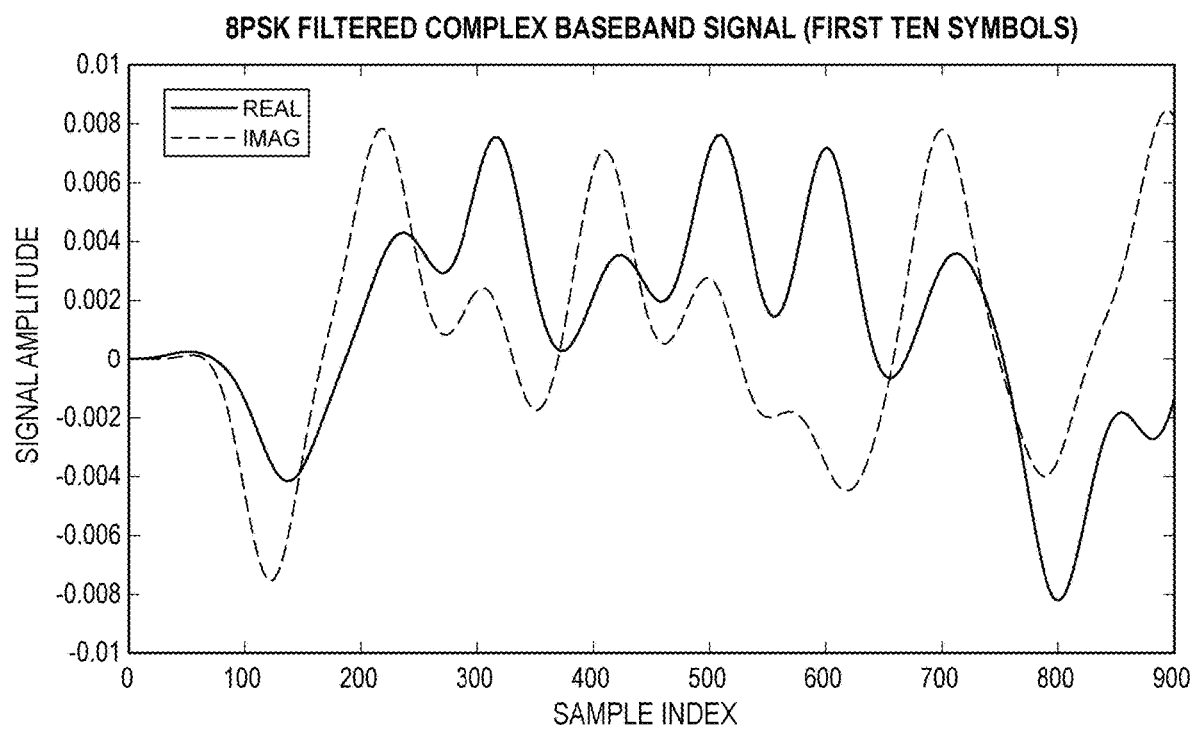
FIG. 14 shows the real and imaginary parts of the filtered complex baseband signal generated by filtering the signal of FIG. 13, according to an embodiment.

FIG. 14 shows the real and imaginary parts of the filtered complex baseband signal generated by filtering the signal of FIGS. 13A and 13B, according to an embodiment. Since the signal of FIG. 14 has been bandlimited to have frequency components at a maximum of around 500 Hz (according to the low pass filter used in this example), it may be downsampled (or decimated) significantly without losing information, as described below with reference to FIG. 15.

Figure 15:
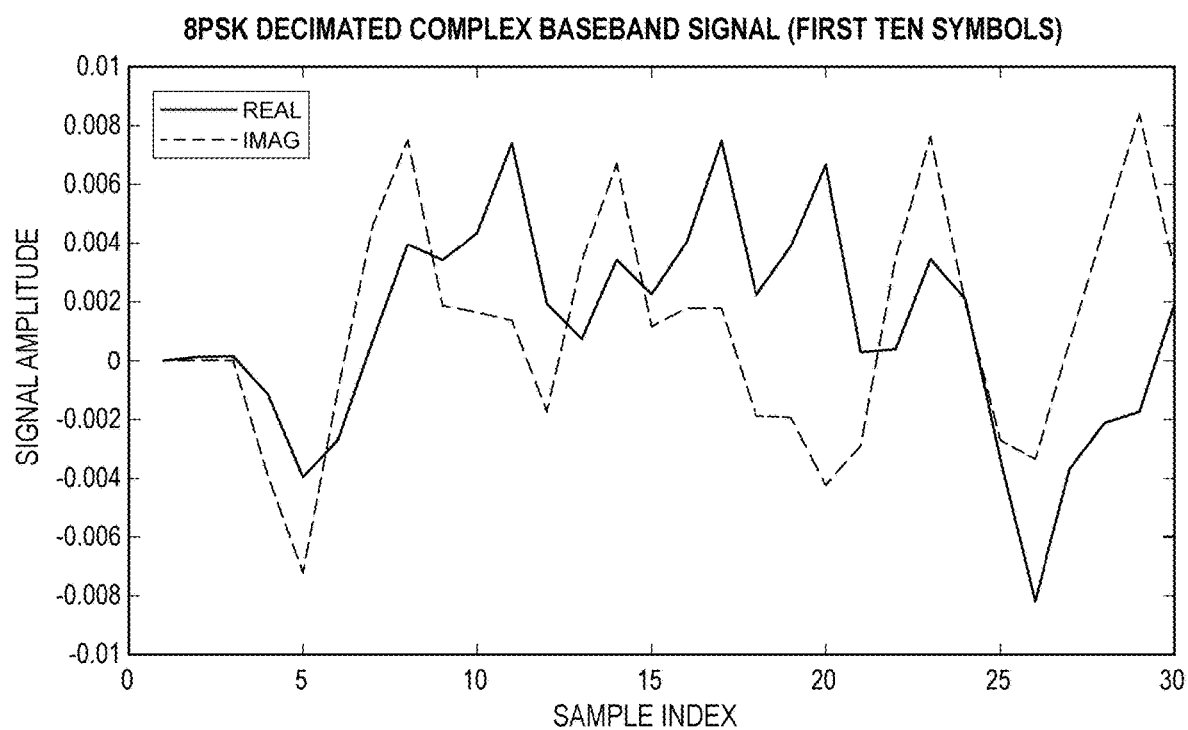
FIG. 15 illustrates the complex baseband signal of FIG. 14 that has been downsampled to a sampling rate of 1.5 kHz, resulting in a decimated complex baseband signal having three samples per symbol, according to an embodiment.

FIG. 15 illustrates the complex baseband signal of FIG. 14 that has been downsampled to a sampling rate of 1.5 kHz, resulting in a decimated complex baseband signal having three samples per symbol, according to an embodiment. Use of the decimated signal of FIG. 15 allows symbols to be decoded with considerably reduced computational effort.

For a given symbol, an adaptive feedforward equalizer is used to analyze the given symbol, a preceding symbol, and a following symbol to determine which samples provide the most useful information about the given (current) symbol. This process is described below and illustrated, for example, in FIGS. 16, 17A, and 17B. In further embodiments, the adaptive feedforward equalizer may be based on more symbols than a given symbol, the preceding symbol and the following symbol as would be readily appreciated by persons of ordinary skill in the art.

Figure 16:
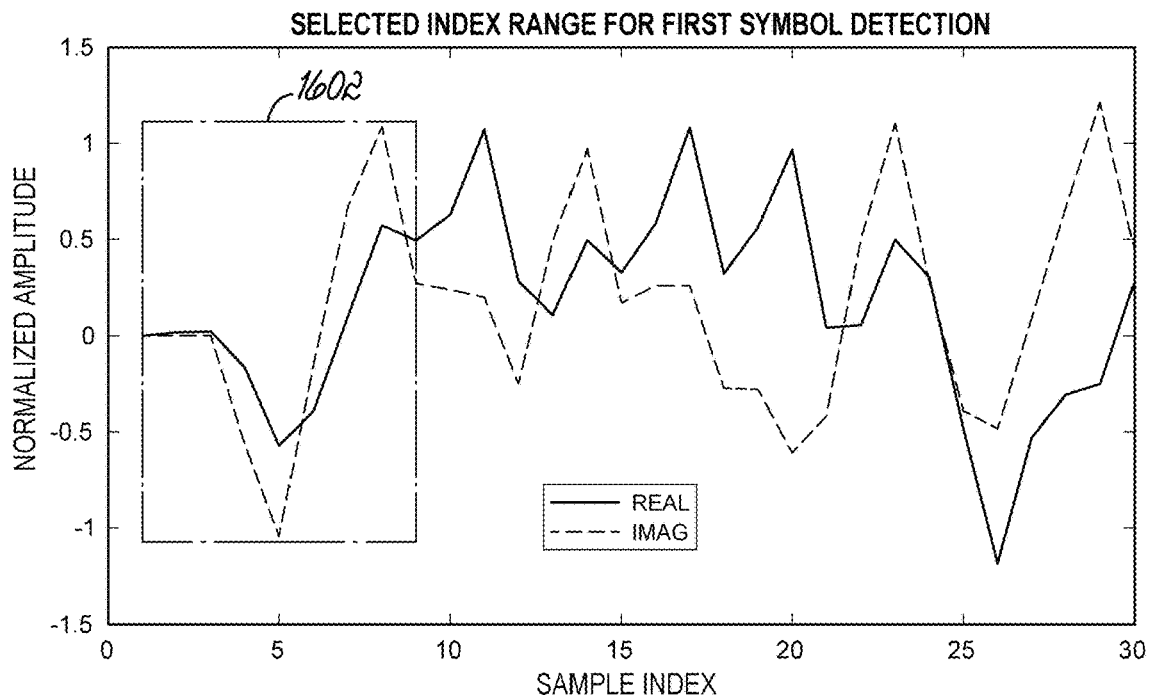
FIG. 16 illustrates a window used by an adaptive feedforward equalizer to analyze a portion of the decimated complex baseband signal of FIG. 15, according to an embodiment.
Figure 17A:
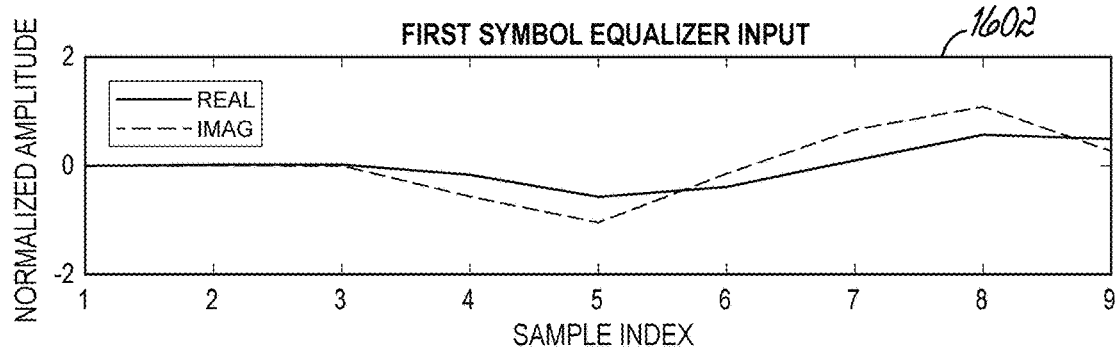
FIG. 17A illustrates an enlarged view of the window of FIG. 16 used by an adaptive feedforward equalizer to analyze a portion of the decimated complex baseband signal of FIG. 15, according to an embodiment.
Figure 17B:
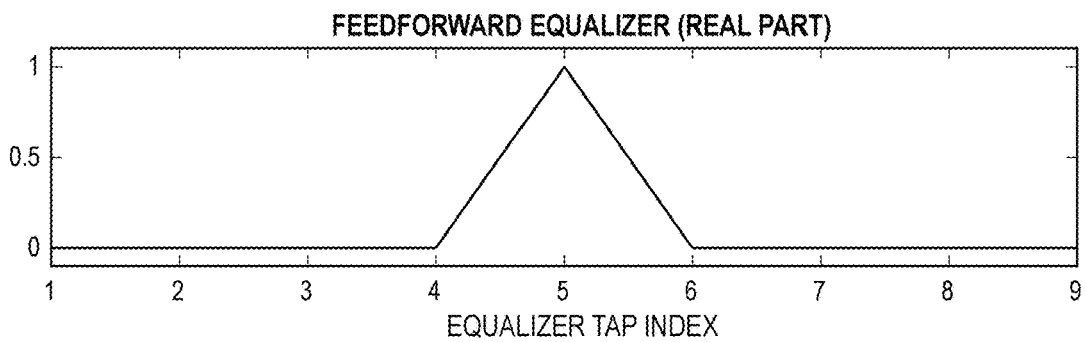
FIG. 17B illustrates a functional form for the adaptive feedforward equalizer, according to an embodiment.

FIG. 16 illustrates a window 1602 used by an adaptive feedforward equalizer to analyze a portion of the decimated complex baseband signal of FIG. 15, according to an embodiment. FIG. 17A illustrates an enlarged view of the window 1602 of FIG. 16 and FIG. 17B illustrates a functional form for the adaptive feedforward equalizer, according to an embodiment. In this example, the adaptive feedforward equalizer, is represented by a triangular functional form represented by 9 taps (samples).

After applying the adaptive feedforward equalizer using the inner product of its 9 taps and the 9 samples in the received complex baseband that represent the previous, current, and next samples, the receiver's estimate of the current symbol may be determined. According to an embodiment, the sonic signal may have a number of training symbols that are known in advance. In this example, the sonic signal may include 25 training symbols. A phase locked loop (PLL) may be used to determine phase errors associated with the received training symbols. Similarly, the adaptive equalizer may be used to determine symbol error of the training symbols.

Figure 18:
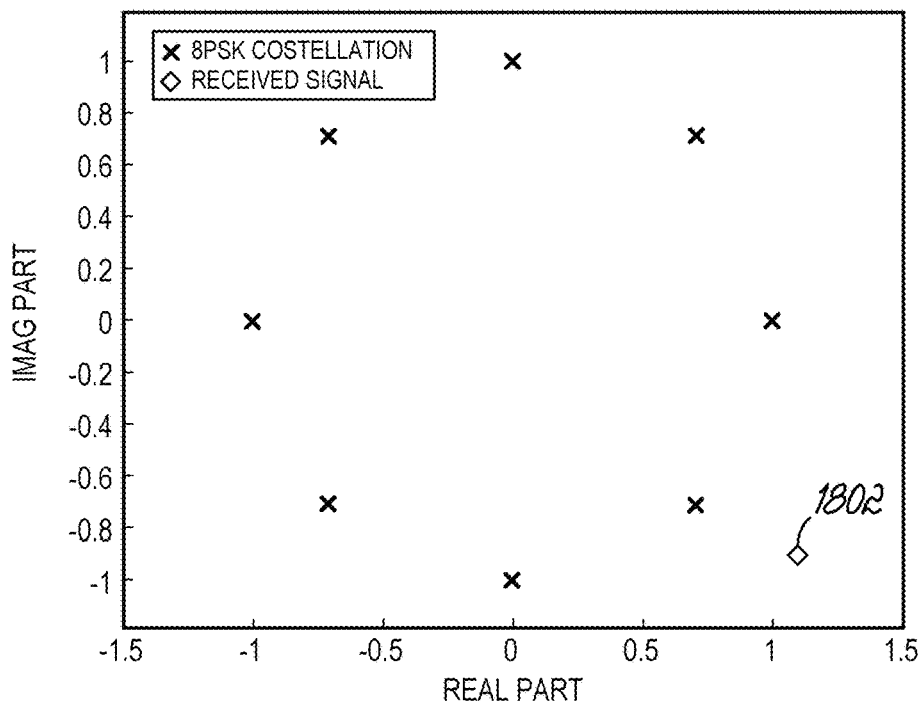
FIG. 18 illustrates a decoded symbol associated with a received signal, according to an embodiment.
Figure 19:
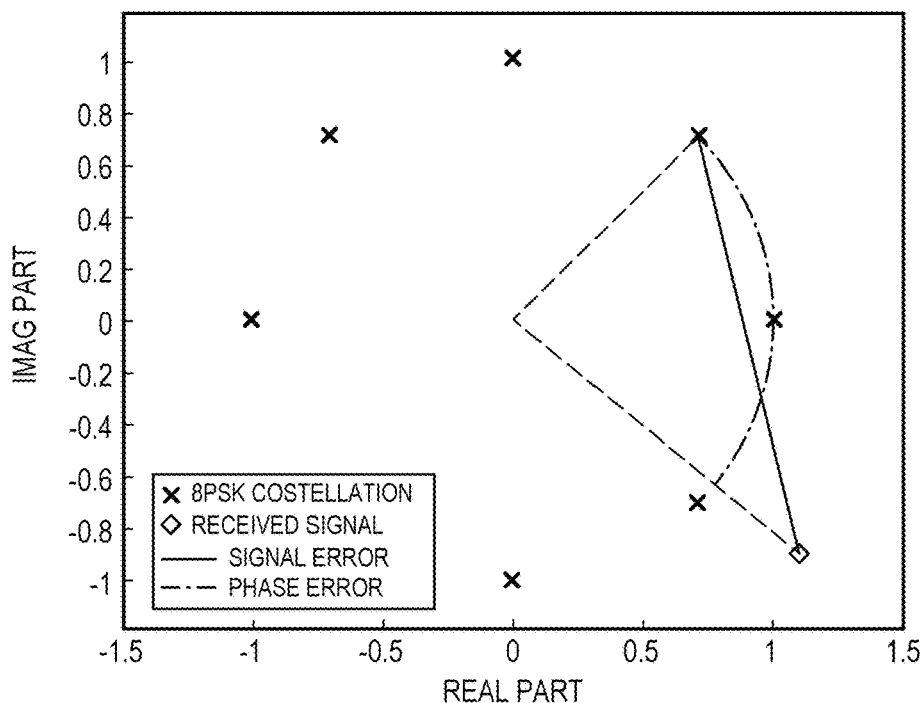
FIG. 19 illustrates symbol error and phase error of the decoded symbol of FIG. 18, according to an embodiment.

In this example, for the first 25 training symbols which are known in advance in the receiver, the adaptive equalizer and the phase-locked loop may adjust their parameters to produce a result that is closer to the actual symbol that was transmitted. FIG. 18 illustrates a decoded symbol 1802 associated with a received signal, according to an embodiment. Clearly the decoded symbol does not agree with one of the indented constellation points. The symbol error and phase error of the decoded symbol may be determined based on the known transmitted training symbol. For this example, the symbol error and phase error are shown in FIG. 19. The phase error is used by the PLL to adjust its local oscillator to correct for phase error in the channel, and the complex symbol error is used by the adaptive equalizer to adjust its taps to modify the relative significance of the samples used to produce the estimate of received signals.

Figure 20:
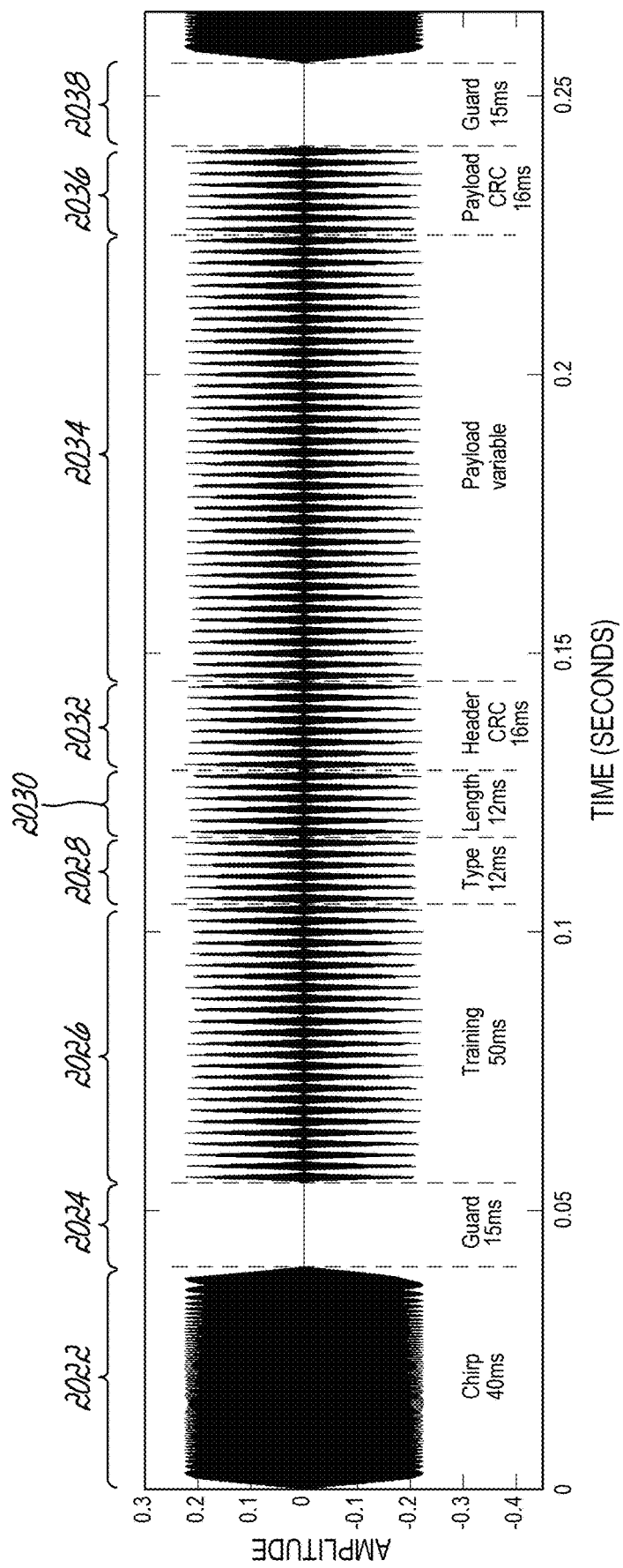
FIG. 20 illustrates an example data format for a sonic signal, according to an embodiment.

FIG. 20 illustrates an example data format for a sonic signal, according to an embodiment. In an example, the sonic signal may include a preamble including a 40 ms chirp 2022 and a 15 ms guard interval 2024. The sonic signal may be followed by training symbols 2026. In this example, there may be 25 training symbols 2026 each for a 2 ms duration for a total of 50 ms. The sonic signal may then include a header that is 40 ms in length. The header may include a type field 2028 that includes 6 symbols for a total duration of 12 ms. The header may further include a payload length field 2030 including 6 symbols for a total duration of 12 ms. The header field may further include a CRC16 field 2032 including 8 symbols for a duration of 16 ms. The sonic signal may then include a variable length payload 2034 with a number of symbols designated by the payload length field 2030 of the header. The sonic signal may conclude with a CRC16 field 2036 including 8 symbols for a duration of 16 ms followed by a 15 ms guard interval 2038. In further embodiments, other data formats may be employed as would be readily appreciated by persons of ordinary skill in the art.

Figure 21:
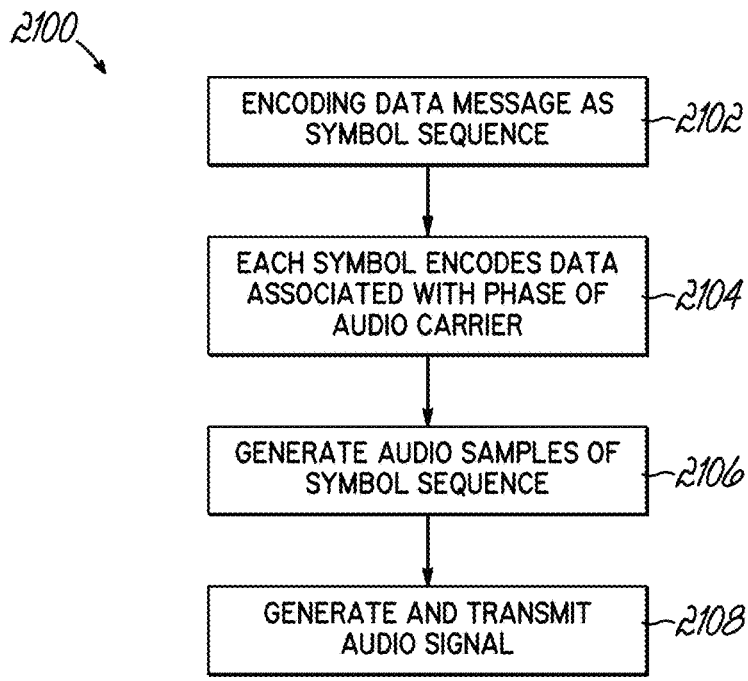
FIG. 21 is a flow chart illustrating a processor implemented method of generating and transmitting a sonic signal that encodes a symbol sequence, representing a data message, for delivery as audio content, according to an embodiment.

FIG. 21 is a flow chart 2100 illustrating a processor implemented method of generating and transmitting a sonic signal that encodes a symbol sequence, representing a data message, for delivery as audio content, according to an embodiment. The method includes encoding 2102, by a processor circuit, the data message as a sequence of symbols, with each symbol being associated with transmission of an audio carrier during a time period. Each symbol encodes 2104 a data value that is associated with respective phase characteristics of the audio carrier during the time period. The method further includes generating 2106, by the processor circuit, audio samples of a digitized version of the sequence of symbols using the phase characteristics of the audio carrier associated with the symbols, and controlling an audio transmitter to generate and transmit 2108 the sonic signal, based on the audio samples.

Figure 22:
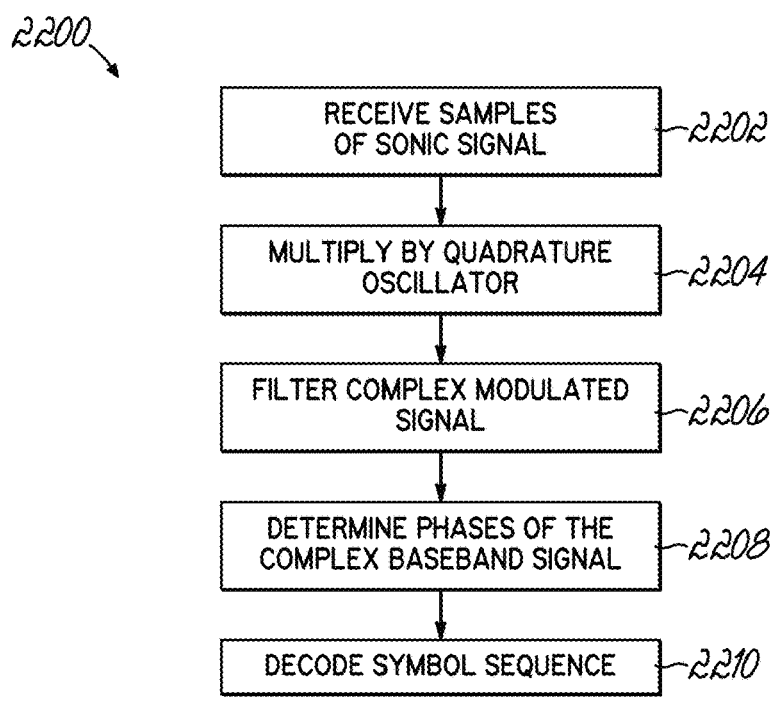
FIG. 22 is a flow chart illustrating a processor implemented method of receiving and decoding a sonic signal that encodes a symbol sequence, representing a data message, as audio content, according to an embodiment.

FIG. 22 is a flow chart 2200 illustrating a processor implemented method of receiving and decoding a sonic signal that encodes a symbol sequence, representing a data message, as audio content, according to an embodiment. The method includes controlling, by the processor circuit, an audio receiver to receive 2202 samples of a digitized version of the sonic signal, into the processor circuit. The method further includes multiplying 2204, by the processor circuit, the digitized version of the audio content by a quadrature oscillator, having a selected carrier frequency and sinusoidal real and imaginary parts that are phase offset by $\pi/2$ radians, to generate a complex modulated signal. The method further includes filtering 2206 the complex modulated signal with a low pass filter to generate a complex baseband signal. The method further includes determining 2208 phases of the complex baseband signal, and decoding 2210 the symbol sequence by identifying symbols corresponding to determined phases of the complex baseband signal.

Figure 23:
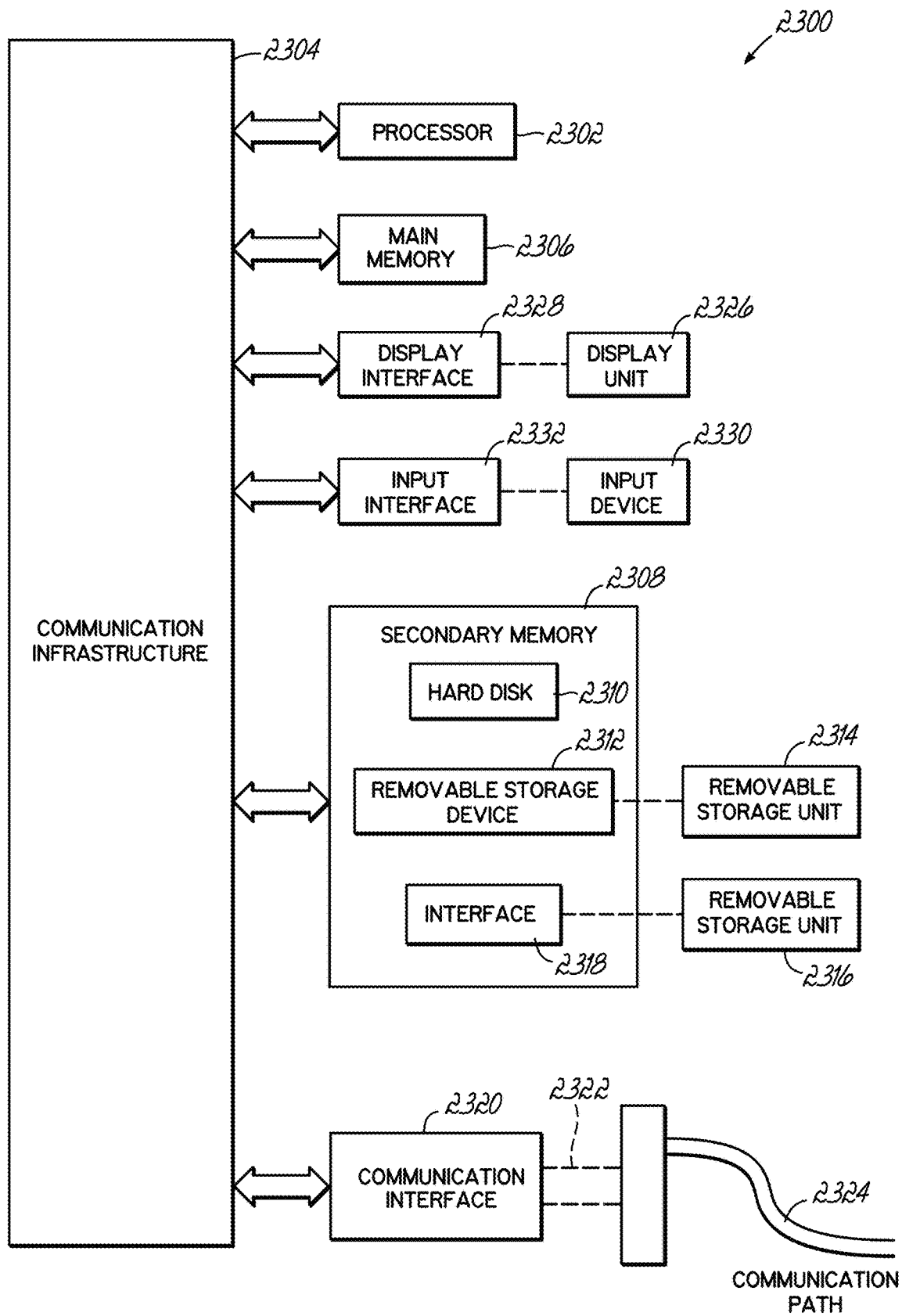
FIG. 23 is a block diagram of an example computer system in which embodiments of the disclosed invention, or portions thereof, may be implemented as computer-readable code, which is executed by one or more processors causing the one or more processors to perform operations of the disclosed invention, according to an embodiment.

FIG. 23 is a block diagram of an example computer system 2300 in which embodiments of the disclosed invention, or portions thereof, may be implemented as computer-readable code, which is executed by one or more processors causing the one or more processors to perform operations of the disclosed invention, according to an embodiment.

For example, systems described above with reference to FIGS. 1, 2, and 3, may include components implemented on computer system 2300 using hardware, software, firmware, tangible computer readable media having instructions stored thereon, or a combination thereof and may be implemented in one or more computer systems or other processing system.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

Various embodiments of the invention are described in terms of this example computer system 2300. After reading this description, it will become apparent to persons of ordinary skill in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

As will be appreciated by persons of ordinary skill in the relevant art, a computing device for implementing the disclosed invention has at least one processor, such as processor 2302, wherein the processor may be a single processor, a plurality of processors, a processor in a multi-core/multi-processor system, such system operating alone, or in a cluster of computing devices operating in a cluster or server farm. Processor 2302 may be connected to a communication infrastructure 2304, for example, a bus, message queue, network, or multi-core message-passing scheme.

Computer system 2300 may also include a main memory 2306, for example, random access memory (RAM), and may also include a secondary memory 2308. Secondary memory 2308 may include, for example, a hard disk drive 2310, removable storage drive 2312. Removable storage drive 2312 may include a floppy disk drive, a magnetic tape drive, an optical disk drive, a flash memory, or the like. The removable storage drive 2312 may be configured to read and/or write data to a removable storage unit 2314 in a well-known manner. Removable storage unit 2314 may include a floppy disk, magnetic tape, optical disk, etc., which is read by and written to, by removable storage drive 2312. As will be appreciated by persons of ordinary skill in the relevant art, removable storage unit 2314 may include a computer readable storage medium having computer software (i.e., computer program instructions) and/or data stored thereon.

In alternative implementations, secondary memory 2308 may include other similar devices for allowing computer programs or other instructions to be loaded into computer system 2300. Such devices may include, for example, a removable storage unit 2316 and an interface 2318. Examples of such devices may include a program cartridge and cartridge interface (such as that found in video game devices), a removable memory chip (such as EPROM or PROM) and associated socket, and other removable storage units 2316 and interfaces 2318 which allow software and data to be transferred from the removable storage unit 2316 to computer system 2300.

Computer system 2300 may also include a communications interface 2320. Communications interface 2320 allows software and data to be transferred between computer system 2300 and external devices. Communications interfaces 2320 may include a modem, a network interface (such as an Ethernet card), a communications port, a PCMCIA slot and card, or the like. Software and data transferred via communications interface 2320 may be in the form of signals 2322, which may be electronic, electromagnetic, optical, or other signals capable of being received by communications interface 2320. These signals may be provided to communications interface 2320 via a communications path 2324.

In this document, the terms "computer program storage medium" and "computer usable storage medium" are used to generally refer to storage media such as removable storage unit 2314, removable storage unit 2316, and a hard disk installed in hard disk drive 2310. Computer program storage medium and computer usable storage medium may also refer to memories, such as main memory 2306 and secondary memory 2308, which may be semiconductor memories (e.g., DRAMS, etc.). Computer system 2300 may further include a display unit 2326 that interacts with communication infrastructure 2304 via a display interface 2328. Computer system 2300 may further include a user input device 2330 that interacts with communication infrastructure 2304 via an input interface 2332. A user input device 2330 may include a mouse, trackball, touch screen, or the like.

Computer programs (also called computer control logic or computer program instructions) are stored in main memory 2306 and/or secondary memory 2308. Computer programs may also be received via communications interface 2320. Such computer programs, when executed, enable computer system 2300 to implement embodiments as discussed herein. In particular, the computer programs, when executed, enable processor 2302 to implement the processes of embodiments of the invention, such as the stages in the methods illustrated by flowcharts 2100 of FIGS. 21 and 2200 of FIG. 22, discussed above. Accordingly, such computer programs represent controllers of the computer system 2300. When an embodiment is implemented using software, the software may be stored in a computer program product and loaded into computer system 2300 using removable storage drive 2312, interface 2318, and hard disk drive 2310, or communications interface 2320.

Embodiments may be implemented using software, hardware, and/or operating system implementations other than those described herein. Any software, hardware, and operating system implementations suitable for performing the functions described herein can be utilized. Embodiments are applicable to both a client and to a server or a combination of both.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically includes computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. The program code may be distributed using a computer-readable storage medium having computer-readable program instructions stored thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general-purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for describing specific embodiments only and is not intended to be limiting of the embodiments of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes," "having," "has," "with," or variants thereof are used in either the detailed description or the claims, such terms are intended to be inclusive in a manner similar to the term "comprising."

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A device configured to generate and transmit a sonic signal that encodes a symbol sequence, representing a data message, for delivery as audio content, the device comprising:
    an audio transmitter; and
    a processor circuit configured to perform the following operations:
        encoding the data message as a sequence of symbols, wherein each symbol is associated with a time period, and the transmission of an audio carrier during the time period, and
            wherein each symbol encodes a data value that is associated with respective phase characteristics of the audio carrier;
        generating audio samples of a digitized version of the sequence of symbols using the phase characteristics of the audio carrier associated with the symbols; and
        controlling the audio transmitter to generate and transmit the sonic signal, based on the audio samples.

2. The device of claim 1, wherein the processor circuit is further configured to generate a complex baseband signal to encode the data message as a sequence of symbols by performing the following operations:
    associating each symbol with a complex phase; and
    generating the complex baseband signal to transition, during the time period of each symbol, from a zero magnitude to a maximum magnitude and then transition back to the zero magnitude,
    wherein the real and imaginary parts of the complex baseband signal during the time period of each symbol are determined by the respective complex phase associated with each symbol.

3. The device of claim 2, wherein the processor circuit is further configured to generate the audio samples of the digitized version of the sequence of symbols by performing the following operations:
    multiplying the complex baseband signal by a quadrature oscillator, having a selected carrier frequency and sinusoidal real and imaginary parts that are phase offset by $\pi/2$ radians, to generate a complex passband signal;
    taking the real part of the complex passband signal to generate a real passband signal; and
    sampling the real passband signal at a plurality of time values during the time period associated with each symbol to generate the audio samples of the digitized version of the sequence of symbols.

4. The device of claim 1, wherein the processor circuit is further configured to encode the symbol sequence representing the data message to include symbols enabling one or more of forward error correction and cyclic redundancy coding.

5. The device of claim 1, wherein the processor circuit is further configured to encode the symbol sequence representing the data message to include training symbols to enable accurate demodulation by a receiver.

6. A device configured to receive and decode a sonic signal that encodes a symbol sequence, representing a data message, as audio content, the device comprising:
- an audio receiver; and
- a processor circuit configured to perform the following operations:
  - controlling the audio receiver to receive samples of a digitized version of the sonic signal, into the processor circuit;
  - multiplying the digitized version of the audio content by a quadrature oscillator, having a selected carrier frequency and sinusoidal real and imaginary parts that are phase offset by $\pi/2$ radians, to generate a complex modulated signal;
  - filtering the complex modulated signal with a low pass filter to generate a complex baseband signal;
  - determining phases of the complex baseband signal; and
  - decoding the symbol sequence by identifying symbols corresponding to determined phases of the complex baseband signal.

7. The device of claim 6, wherein the processor circuit is further configured to perform the following operations:
- applying an adaptive feedforward equalizer to determine a plurality of samples giving an optimal description of a given symbol.

8. The device of claim 7, wherein the processor circuit is further configured to perform the following operations:
- decoding a symbol sequence corresponding to a known sequence of training symbols;
- applying the adaptive feedforward equalizer to determine complex symbol errors associated with decoded training symbols;
- applying a phase-locked loop to determine phase errors associated with the decoded training symbols; and
- adjusting parameters of the adaptive feedforward equalizer and phase-locked loop to thereby improve symbol detection accuracy.

9. The device of claim 6, wherein the processor circuit is further configured to perform the following operations:
- performing error correction of the decoded symbol sequence using one or more of forward error correction and cyclic redundancy coding.

10. The device of claim 6, wherein the processor circuit is further configured to perform the following operations:
- downsampling the complex baseband signal to generate a decimated complex baseband signal;
- determining phases of the decimated complex baseband signal; and
- decoding the symbol sequence by identifying symbols corresponding to determined phases of the decimated complex baseband signal.

11. A processor implemented method of generating and transmitting a sonic signal that encodes a symbol sequence, representing a data message, for delivery as audio content, the method comprising:
- encoding, by a processor circuit, the data message as a sequence of symbols,
  - wherein each symbol is associated with a time period, and the transmission of an audio carrier during the time period, and
  - wherein each symbol encodes a data value that is associated with respective phase characteristics of the audio carrier;
- generating, by the processor circuit, audio samples of a digitized version of the sequence of symbols using the phase characteristics of the audio carrier associated with the symbols; and
- controlling an audio transmitter to generate and transmit the sonic signal, based on the audio samples.

12. The method of claim 11, further comprising generating a complex baseband signal to encode the data message as a sequence of symbols by performing the following operations:
- associating, by the processor circuit, each symbol with a complex phase; and
- generating the complex baseband signal to transition, during the time period of each symbol, from a zero magnitude to a maximum magnitude and then transition back to the zero magnitude,
- wherein the real and imaginary parts of the complex baseband signal during the time period of each symbol are determined by the respective complex phase associated with each symbol.

13. The method of claim 12, further comprising generating the audio samples of the digitized version of the sequence of symbols by performing the following operations:
- multiplying, by the processor circuit, the complex baseband signal by a quadrature oscillator, having a selected carrier frequency and sinusoidal real and imaginary parts that are phase offset by $\pi/2$ radians, to generate a complex passband signal;
- taking the real part of the complex passband signal to generate a real passband signal; and
- sampling the real passband signal at a plurality of time values during the time period associated with each symbol to generate the audio samples of the digitized version of the sequence of symbols.

14. The method of claim 11, further comprising:
- encoding, by the processor circuit, the symbol sequence representing the data message to include symbols enabling one or more of forward error correction and cyclic redundancy coding.

15. The method of claim 11, further comprising:
- encoding, by the processor circuit, the symbol sequence representing the data message to include training symbols to enable accurate demodulation by a receiver.

16. A processor implemented method of receiving and decoding a sonic signal that encodes a symbol sequence, representing a data message, as audio content, the method comprising:
- controlling, by a processor circuit, an audio receiver to receive samples of a digitized version of the sonic signal, into the processor circuit;
- multiplying the digitized version of the audio content by a quadrature oscillator, having a selected carrier frequency and sinusoidal real and imaginary parts that are phase offset by $\pi/2$ radians, to generate a complex modulated signal;
- filtering the complex modulated signal with a low pass filter to generate a complex baseband signal;
- determining phases of the complex baseband signal; and
- decoding the symbol sequence by identifying symbols corresponding to determined phases of the complex baseband signal.

17. The method of claim 16, further comprising:
- applying, by the processor circuit, an adaptive feedforward equalizer to determine a plurality of samples giving an optimal description of a given symbol.

18. The method of claim 17, further comprising:
decoding, by the processor circuit, a symbol sequence corresponding to a known sequence of training symbols;
applying the adaptive feedforward equalizer to determine complex symbol errors associated with decoded training symbols;
applying a phase-locked loop to determine phase errors associated with the decoded training symbols; and
adjusting parameters of the adaptive feedforward equalizer and phase-locked loop to thereby improve symbol detection accuracy.

19. The method of claim 16, further comprising:
performing, by the processor circuit, error correction of the decoded symbol sequence using one or more of forward error correction and cyclic redundancy coding.

20. The method of claim 16, further comprising:
downsampling, by the processor circuit, the complex baseband signal to generate a decimated complex baseband signal;
determining phases of the decimated complex baseband signal; and
decoding the symbol sequence by identifying symbols corresponding to determined phases of the decimated complex baseband signal.

* * * * *